(12) United States Patent
Ito et al.

(10) Patent No.: US 9,278,281 B2
(45) Date of Patent: Mar. 8, 2016

(54) COMPUTER-READABLE STORAGE MEDIUM, INFORMATION PROCESSING APPARATUS, INFORMATION PROCESSING SYSTEM, AND INFORMATION PROCESSING METHOD

(75) Inventors: Yuichiro Ito, Kyoto (JP); Tetsuya Noge, Kai (JP)

(73) Assignees: NINTENDO CO., LTD., Kyoto (JP); HAL LABORATORY INC., Tokyo (JP)

( * ) Notice: Subject to any disclaimer, the term of this patent is extended or adjusted under 35 U.S.C. 154(b) by 222 days.

(21) Appl. No.: 13/243,622

(22) Filed: Sep. 23, 2011

(65) Prior Publication Data

US 2012/0075430 A1 Mar. 29, 2012

(30) Foreign Application Priority Data

Sep. 27, 2010 (JP) .................................. 2010-215654
Jan. 18, 2011 (JP) .................................. 2011-007853

(51) Int. Cl.
*G06T 15/00* (2011.01)
*H04N 13/02* (2006.01)
(Continued)

(52) U.S. Cl.
CPC ................. *A63F 13/10* (2013.01); *A63F 13/06* (2013.01); *G06T 7/0042* (2013.01); *H04N 13/004* (2013.01); *H04N 13/0275* (2013.01); *A63F 2300/1093* (2013.01); *A63F 2300/204* (2013.01); *A63F 2300/6045* (2013.01);
(Continued)

(58) Field of Classification Search
CPC .. H04N 13/0275; G06T 15/00; G06T 19/006; G06T 15/04

USPC .......................................................... 348/47
See application file for complete search history.

(56) References Cited

U.S. PATENT DOCUMENTS 5,161,803 A  11/1992  Ohara
5,184,830 A  2/1993  Okada et al.
(Continued)

FOREIGN PATENT DOCUMENTS

CN  1244762  2/2000
CN  1845064  10/2006
(Continued)

OTHER PUBLICATIONS

Otsuki et al. "Novel Interaction Methods with Mixed Reality Space" SICE Annual Conference, The University Electro-Communications, pp. 456-460, Japan Aug. 20-22, 2008.
(Continued)

*Primary Examiner* — Christopher S Kelley
*Assistant Examiner* — Deirdre Beasley
(74) *Attorney, Agent, or Firm* — Nixon & Vanderhye P.C.

(57) ABSTRACT

A marker present in a real space is detected from each of a real image for a left eye and a real image for a right eye. The position and the orientation of each of imaging sections relative to the marker are calculated. A left virtual camera and a right virtual camera are set in accordance with the positions and the orientations of the imaging sections. A virtual model having a planar shape is placed in a marker coordinate system, and areas in the real image for a left eye and the real image for a right eye that correspond to the virtual model are set as a left texture area and a right texture area, respectively. Each of images included in a left texture area and a right texture area is applied, as a texture, to a deformation object into which the virtual model is deformed.

14 Claims, 15 Drawing Sheets

(51) Int. Cl.
*A63F 13/40* (2014.01)
*A63F 13/20* (2014.01)
*H04N 13/00* (2006.01)
*G06T 7/00* (2006.01)

(52) U.S. Cl.
CPC .... *A63F 2300/66* (2013.01); *A63F 2300/6692* (2013.01); *A63F 2300/69* (2013.01); *A63F 2300/8029* (2013.01); *G06T 2207/10012* (2013.01); *G06T 2207/30204* (2013.01)

(56) References Cited

U.S. PATENT DOCUMENTS

| | | | |
|---|---|---|---|
| 5,684,529 | A | 11/1997 | Yoshimi et al. |
| 5,704,837 | A | 1/1998 | Iwasaki et al. |
| 5,964,830 | A | 10/1999 | Durrett |
| 6,005,607 | A | 12/1999 | Uomori et al. |
| 6,020,891 | A | 2/2000 | Rekimoto |
| 6,042,478 | A | 3/2000 | Ng |
| 6,057,833 | A | 5/2000 | Heidmann et al. |
| 6,057,909 | A | 5/2000 | Yahav et al. |
| 6,160,574 | A | 12/2000 | Oba et al. |
| 6,252,624 | B1 | 6/2001 | Yuasa et al. |
| 6,313,864 | B1 | 11/2001 | Tabata et al. |
| 6,325,287 | B1 | 12/2001 | Nakajima et al. |
| 6,342,900 | B1 | 1/2002 | Ejima et al. |
| 6,384,859 | B1* | 5/2002 | Matsumoto et al. ............ 348/43 |
| 6,474,819 | B2 | 11/2002 | Yoder et al. |
| 6,504,710 | B2 | 1/2003 | Sutton et al. |
| 6,529,875 | B1 | 3/2003 | Nakajima et al. |
| 6,708,046 | B1 | 3/2004 | Takagi |
| 6,743,104 | B1 | 6/2004 | Ota et al. |
| 6,810,463 | B2 | 10/2004 | Okada et al. |
| 6,820,056 | B1 | 11/2004 | Harif |
| 6,897,865 | B2 | 5/2005 | Higashiyama |
| 7,321,682 | B2 | 1/2008 | Tooyama |
| 7,371,163 | B1* | 5/2008 | Best ................................. 463/1 |
| 7,374,490 | B2 | 5/2008 | Tahara et al. |
| 7,519,218 | B2 | 4/2009 | Takemoto et al. |
| 7,532,224 | B2 | 5/2009 | Bannai |
| 7,571,103 | B2 | 8/2009 | Mizuki et al. |
| 7,643,025 | B2* | 1/2010 | Lange .......................... 345/419 |
| 7,760,242 | B2 | 7/2010 | Anabuki |
| 8,115,814 | B2 | 2/2012 | Iwase et al. |
| 8,189,038 | B2 | 5/2012 | Decusatis et al. |
| 8,202,094 | B2 | 6/2012 | Spector |
| 8,305,428 | B2 | 11/2012 | Hu |
| 8,411,931 | B2* | 4/2013 | Zhou et al. ................... 382/154 |
| 8,418,924 | B2 | 4/2013 | Hepworth et al. |
| 8,830,304 | B2 | 9/2014 | Miyatani et al. |
| 2001/0019946 | A1 | 9/2001 | Okuda |
| 2002/0078291 | A1 | 6/2002 | Sutton et al. |
| 2002/0113865 | A1 | 8/2002 | Yano et al. |
| 2002/0120925 | A1 | 8/2002 | Logan |
| 2003/0062675 | A1 | 4/2003 | Noro et al. |
| 2004/0077404 | A1 | 4/2004 | Schlottmann et al. |
| 2005/0018045 | A1 | 1/2005 | Thomas et al. |
| 2005/0089212 | A1 | 4/2005 | Mashitani et al. |
| 2005/0129325 | A1 | 6/2005 | Wu |
| 2005/0239521 | A1 | 10/2005 | Harada et al. |
| 2005/0253924 | A1 | 11/2005 | Mashitani |
| 2005/0270368 | A1 | 12/2005 | Hashimoto |
| 2006/0038833 | A1 | 2/2006 | Mallinson et al. |
| 2006/0060463 | A1 | 3/2006 | Tokusashi |
| 2006/0071945 | A1 | 4/2006 | Anabuki |
| 2006/0073892 | A1 | 4/2006 | Watanabe et al. |
| 2006/0171582 | A1 | 8/2006 | Eichhorn |
| 2006/0203085 | A1 | 9/2006 | Tomita |
| 2006/0227151 | A1 | 10/2006 | Bannai |
| 2006/0232584 | A1 | 10/2006 | Utsugi et al. |
| 2006/0239558 | A1 | 10/2006 | Rafii et al. |
| 2006/0244757 | A1* | 11/2006 | Fang et al. .................... 345/582 |
| 2007/0001003 | A1 | 1/2007 | Lee et al. |
| 2007/0038944 | A1 | 2/2007 | Carignano et al. |
| 2007/0126733 | A1* | 6/2007 | Yang et al. .................... 345/419 |
| 2007/0178952 | A1 | 8/2007 | Ehara et al. |
| 2007/0197291 | A1 | 8/2007 | Shimizu et al. |
| 2007/0216766 | A1 | 9/2007 | Nakaya |
| 2007/0236514 | A1* | 10/2007 | Agusanto et al. ............. 345/646 |
| 2007/0260984 | A1 | 11/2007 | Marks et al. |
| 2007/0273644 | A1 | 11/2007 | Natucci |
| 2008/0024523 | A1 | 1/2008 | Tomite et al. |
| 2008/0037863 | A1* | 2/2008 | Tooyama et al. .............. 382/154 |
| 2008/0071559 | A1* | 3/2008 | Arrasvuori ........................ 705/1 |
| 2008/0100620 | A1 | 5/2008 | Nagai et al. |
| 2008/0109729 | A1 | 5/2008 | Notea et al. |
| 2008/0188303 | A1 | 8/2008 | Schlottmann et al. |
| 2008/0215973 | A1 | 9/2008 | Zalewski et al. |
| 2008/0225041 | A1 | 9/2008 | El Dokor et al. |
| 2008/0246757 | A1 | 10/2008 | Ito |
| 2008/0266386 | A1 | 10/2008 | Maeda |
| 2008/0284842 | A1* | 11/2008 | Hu .................................. 348/46 |
| 2008/0292131 | A1 | 11/2008 | Takemoto et al. |
| 2009/0033740 | A1 | 2/2009 | Ishikawa et al. |
| 2009/0059497 | A1 | 3/2009 | Kuwahara et al. |
| 2009/0060490 | A1 | 3/2009 | Kuwahara et al. |
| 2009/0070476 | A1 | 3/2009 | Brackx et al. |
| 2009/0224999 | A1 | 9/2009 | Kuwahara et al. |
| 2009/0262108 | A1 | 10/2009 | Davidson |
| 2009/0278764 | A1 | 11/2009 | Kuwahara et al. |
| 2009/0278974 | A1 | 11/2009 | Kuwahara et al. |
| 2009/0285484 | A1 | 11/2009 | Mallinson et al. |
| 2009/0303231 | A1 | 12/2009 | Robinet et al. |
| 2009/0322860 | A1* | 12/2009 | Zhang et al. ..................... 348/46 |
| 2010/0020222 | A1 | 1/2010 | Jones et al. |
| 2010/0026712 | A1 | 2/2010 | Aliprandi et al. |
| 2010/0048290 | A1 | 2/2010 | Baseley et al. |
| 2010/0085423 | A1* | 4/2010 | Lange .............................. 348/46 |
| 2010/0085693 | A1 | 4/2010 | Koshiishi |
| 2010/0091096 | A1 | 4/2010 | Oikawa et al. |
| 2010/0103075 | A1 | 4/2010 | Kalaboukis et al. |
| 2010/0120473 | A1 | 5/2010 | Oh |
| 2010/0136507 | A1 | 6/2010 | Miyata et al. |
| 2010/0182432 | A1 | 7/2010 | Augst |
| 2010/0257252 | A1 | 10/2010 | Dougherty et al. |
| 2010/0304857 | A1 | 12/2010 | Suzuki et al. |
| 2010/0316367 | A1 | 12/2010 | Kuwahara et al. |
| 2011/0029903 | A1 | 2/2011 | Schooleman |
| 2011/0034103 | A1 | 2/2011 | Fong et al. |
| 2011/0109720 | A1* | 5/2011 | Smolic et al. ................... 348/43 |
| 2011/0117958 | A1 | 5/2011 | Kim et al. |
| 2011/0205341 | A1 | 8/2011 | Wilson et al. |
| 2011/0242361 | A1* | 10/2011 | Kuwahara et al. ......... 348/231.4 |
| 2011/0252122 | A1 | 10/2011 | Takeda et al. |
| 2011/0292033 | A1 | 12/2011 | Umezu et al. |
| 2011/0304611 | A1 | 12/2011 | Suzuki |
| 2011/0304714 | A1 | 12/2011 | Akifusa et al. |
| 2012/0007953 | A1 | 1/2012 | Sung |
| 2012/0077582 | A1 | 3/2012 | Noge |
| 2012/0113228 | A1 | 5/2012 | Konno et al. |

FOREIGN PATENT DOCUMENTS

| | | |
|---|---|---|
| CN | 101039441 | 9/2007 |
| EP | 1 720 131 | 11/2006 |
| EP | 2 157 545 | 2/2010 |
| EP | 2 172 252 | 4/2010 |
| EP | 2 187 295 | 5/2010 |
| JP | 06-339155 | 12/1994 |
| JP | 10-51711 | 2/1998 |
| JP | 2000-69404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-159019 | 5/2002 |
| JP | 2002-230586 | 8/2002 |
| JP | 1160365 | 12/2002 |
| JP | 2003-103052 | 4/2003 |
| JP | 2004-7214 | 1/2004 |
| JP | 2004-310686 | 11/2004 |
| JP | 2005-20559 | 1/2005 |
| JP | 2005-151162 | 6/2005 |

(56) References Cited

FOREIGN PATENT DOCUMENTS

| JP | 2005-165776 | 6/2005 |
|---|---|---|
| JP | 2005-230139 | 9/2005 |
| JP | 2005-250950 | 9/2005 |
| JP | 2005-286714 | 10/2005 |
| JP | 2006-024175 | 1/2006 |
| JP | 2006-060516 | 3/2006 |
| JP | 2006-72667 | 3/2006 |
| JP | 2006-86099 | 3/2006 |
| JP | 2006-235774 | 9/2006 |
| JP | 2006-262980 | 10/2006 |
| JP | 2006-271663 | 10/2006 |
| JP | 2007-12025 | 1/2007 |
| JP | 2007-293453 | 11/2007 |
| JP | 2008-502206 | 1/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 2008-277903 | 11/2008 |
| JP | 2008-277920 | 11/2008 |
| JP | 2009-025918 | 2/2009 |
| JP | 4260215 | 2/2009 |
| JP | 2009-089435 | 4/2009 |
| JP | 2009-151608 | 7/2009 |
| JP | 2009-205556 | 9/2009 |
| JP | 2010-092436 | 4/2010 |
| JP | 2010-170316 | 8/2010 |
| JP | 2010-532120 | 9/2010 |
| JP | 2010-239568 | 10/2010 |
| JP | 2010-244575 | 10/2010 |
| JP | 2010-271950 | 12/2010 |
| WO | 98/02223 | 1/1998 |
| WO | 03/105450 | 12/2003 |
| WO | WO 2009/127701 A1 | 10/2009 |

OTHER PUBLICATIONS

Office Action for U.S. Appl. No. 12/946,248, mailed Oct. 7, 2013.
Advisory Action issued on Jan. 15, 2015 in U.S. Appl. No. 13/158,939.
Office Action issued in U.S. Appl. No. 13/746,600 dated May 27, 2015.
Office Action issued in U.S. Appl. No. 13/158,939 dated Mar. 25, 2015.
Office Action issued in U.S. Appl. No. 13/158,824 dated Mar. 25, 2015.
Advisory Action issued in U.S. Appl. No. 13/158,824 dated Aug. 19, 2014.
Office Action issued in U.S. Appl. No. 13/158,824 dated Oct. 3, 2014.
Watt, Alan, 3D Computer Graphics, Addison Wesley, 3rd Edition, 2000, pp. 1-17.
Sep. 20, 2012 Office Action in U.S. Appl. No. 12/862,119, 31 pages.
Report on Nintendo DS Lite Hardware, Mar. 2, 2006, download from the internet, with a partial English translation, 13 pages.
Kato et al., "An Augmented Reality System and its Calibration based on Marker Tracking", Transactions of the Virtual Reality Society of Japan, vol. 4, No. 4, 1999, pp. 607-616.
Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999, 10 pages.
Report on Nintendo DS Lite Hardwire, Mar. 2, 2006, 5 pages, http://pc.watch.impress.co.jp/docs/2006/0302/nintendo.htm.
Yokoya et al., "Stereo Vision Based Video See-through Mixed Reality" Mixed Reality, Merging Real and Virtual Worlds, Proceedings of International Symposium on Mix Reality, Merging Real and Virtual Worlds, Jan. 1, 1999, pp. 131-145, 15 pages.
U.S. Appl. No. 12/862,119, filed Aug. 24, 2010, Shinji Kitahara et al.
U.S. Appl. No. 12/946,248, filed Nov. 15, 2010, Yasuyuki Oyagi et al.
U.S. Appl. No. 13/030,499, filed Feb. 18, 2011, Yui Ehara et al.
U.S. Appl. No. 13/158,824, filed Jun. 13, 2011, Yuichiro Ito.
U.S. Appl. No. 13/158,939, filed Jun. 13, 2011, Yuichiro Ito.
U.S. Appl. No. 13/158,736, filed Jun. 13, 2011, Yuichiro Ito.
U.S. Appl. No. 13/006,039, filed Jan. 13, 2011, Hideki Konno et al.
U.S. Appl. No. 13/243,622, filed Sep. 23, 2011, Yuichiro Ito et al.
May 23, 2013 Office Action from U.S. Appl. No. 13/158,736, 41 pages.
Yoon et al., Interactive Training for Synthetic Characters, American Association for Artificial Intelligence (1999), 6 pages.
Mar. 29, 2013 Final Office Action for U.S. Appl. No. 12/946,248, 40 pages.
Apr. 25, 2013 Final Office Action for U.S. Appl. No. 12/862,119, 31 pages.
Apr. 15, 2013 Notice of Allowance for U.S. Appl. No. 13/030,499, 18 pages.
Jun. 11, 2012, Notice of Allowance for U.S. Appl. No. 13/006,039, 16 pages.
Office Action issued in U.S. Appl. No. 13/746,600 dated May 28, 2015.
European Search Report and Written Opinion dated Apr. 24, 2014 issued in connection with European Patent Appln. No. 11155148.7.
Andrew Bookholt: "MacBook Pro 15" Unibody Mid 2010 LCD Replacement", iFixit, Apr. 13, 2010, XP002722878, Retrieved from the Internet: URL:http://ifixit-guide-pdfs.s3.amazonaws.com/guide_3581_en.pdf [retrieved on Mar. 5, 2014] * pp. 20, 22, 24*.
"MacBook Pro", Wikipedia, Jun. 9, 2010, XP002722879, Retrieved from the Internet: URL:http://en.wikipedia.org/w/index.php?title=MacBook_Pro&oldid=366931126 [retrieved on Mar. 5, 2014].
Jason Chen: "Open Gal", Gizmode, Apr. 20, 2010, XP002722880, Retrieved from the Internet: URL:http://gizmodo.com/5520877/open-gal//all [retrieved on Mar. 5, 2014] * pp. 1, 2, 4-6 *.
Andrew Liszewski: "Hands-On With the Nintendo DSi", OhGizmo!, May 6, 2010, XP002722881, Retrieved from the Internet: URL:http://www.ohgizmo.com/2009/05/06/hands-on-with-the-nintendo-dsi/ [retrieved on Mar. 31, 2014] * p. 6; figure 2 *.
Nintendo Repair Shop Inc.: "How to Repair DS Hinge and Shell", YouTube, Mar. 11, 2005, Retrieved from the Internet: URL:http://www.youtube.com/watch?v=HxHpQTxCcT0 [retrieved on Apr. 1, 2014].
"Nintendo DS," Wikipedia, Jun. 10, 2010 XP002722882, Retrieved from Internet: URL: http://en.wikipedia.org/w/index.php?titl=Nintendo_DS&oldid=367317982 [retrieved on Apr. 1, 2014].
Office Action dated May 8, 2014 issued in connection with U.S. Appl. No. 13/158,824, filed Jun. 13, 2011.
Office Action dated May 7, 2014 issued in connection with U.S. Appl. No. 13/158,939, filed Jun. 13, 2011.
Office Action for U.S. Appl. No. 13/158,939, mailed Nov. 8, 2013.
Office Action for U.S. Appl. No. 13/158,736, mailed Oct. 28, 2013.
Nov. 9, 2012 Office Action in U.S. Appl. No. 12/946,248, 40 pages.
Oct. 23, 2013 Office Action in U.S. Appl. No. 13/158,824, 48 pages.
Notebook Computer [Vaio Note Z] PCG-Z1/P, Japan, Sony Co., Ltd., Mar. 2003, Internet <URL: http://www.vaio.sony.co.jp/Products/Pdf/pcg-zl.pdf>, [searched on Oct. 24, 2013], 8 pages.
Nov. 5, 2013 Notice of Reasons for Rejection for JP 2010-135192, with an English translation, 6 pages.
Jul. 11, 2013 Office Action in U.S. Appl. No. 13/158,939, 33 pages.
Notice of Allowance issued in U.S. Appl. No. 13/746,600 dated Oct. 26, 2015.

* cited by examiner

F I G. 1 5
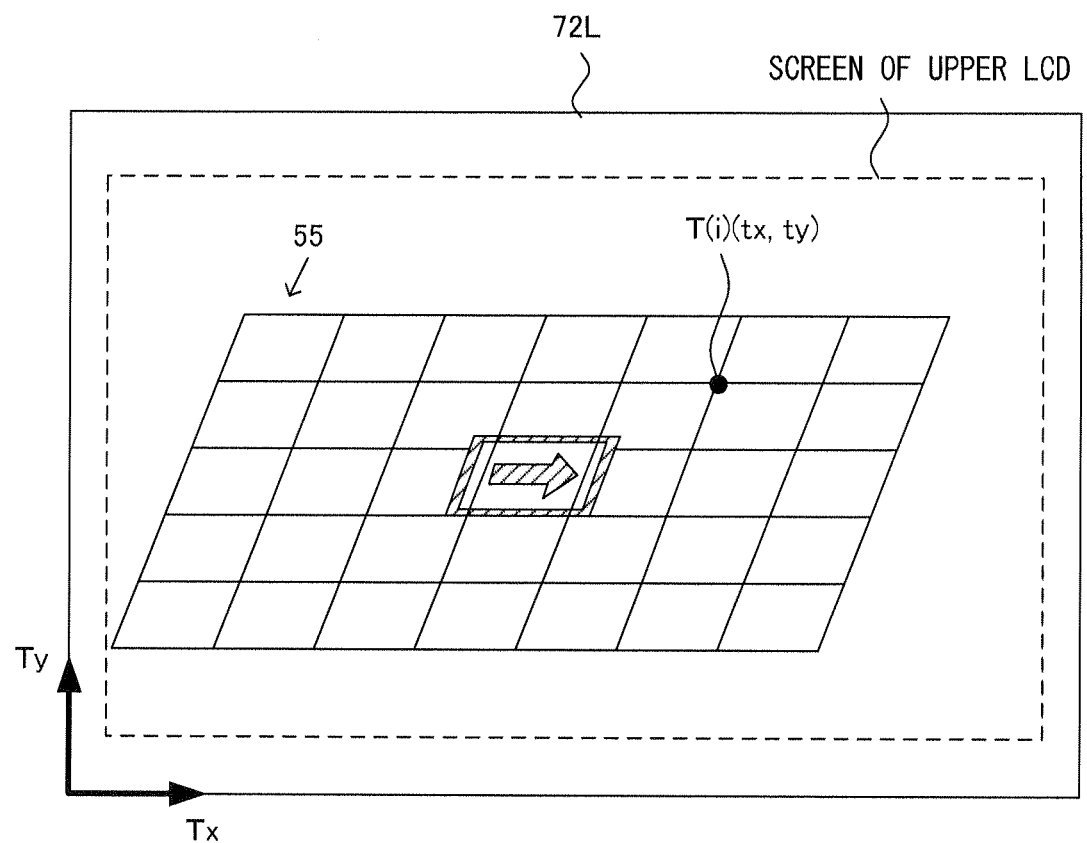

COMPUTER-READABLE STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-215654, filed on Sep. 27, 2010, and the disclosure of Japanese Patent Application No. 2011-007853, filed on Jan. 18, 2011, are incorporated herein by reference.

FIELD

The illustrative embodiments relate to a computer-readable storage medium, an information processing apparatus, an information processing system, and an information processing method, capable of generating a stereoscopically visible image by using an image shot by a stereo camera, and a virtual object.

BACKGROUND AND SUMMARY

In recent years, there have been known techniques of making expressions in which a real space and a virtual space are fused, by using a stereoscopic technique. One example of such techniques superimposes CG images of a model for CG shot by left and right virtual cameras, on real images shot by left and right imaging sections, thereby displaying a stereoscopic image in which a real space and a virtual space are fused.

However, in the above example of the techniques, the CG images are generated by using an image different from an image obtained by shooting a real space. Therefore, this technique is insufficient for making various expressions by fusing the CG images and the image of a real space. That is, the CG images, which are superimposed on an image obtained by shooting a real space, are images obtained by shooting a model prepared in advance with a virtual camera. Therefore, a manner of displaying the model has no diversity, and the range of expression is limited.

Therefore, a feature of the illustrative embodiments is to provide an information processing technique capable of making various expressions by using an image shot by a real camera, and a virtual model.

The illustrative embodiments employ the following configurations to solve the above problems.

One aspect of the illustrative embodiments is a computer-readable storage medium having stored therein an information processing program executed by a computer included in an information processing apparatus connected to a left real camera and a right real camera for shooting a real space, and to display means capable of displaying a stereoscopic visible image, the information processing program causing a computer to function as: real image obtaining means; virtual camera setting means; left texture area setting means; right texture area setting means; left virtual camera image obtaining means; right virtual camera image obtaining means; and display control means. The real image obtaining means obtains a real image for a left eye shot by the left real camera, and a real image for a right eye shot by the right real camera. The virtual camera setting means sets a left virtual camera and a right virtual camera in a virtual space such that the left virtual camera and the right virtual camera are placed in accordance with a position and an orientation of the left real camera in the real space, and a position and an orientation of the right real camera in the real space. The left texture area setting means sets, as a left texture area, an area in the real image for a left eye that corresponds to a predetermined virtual model in the virtual space when the area is looked at from the left virtual camera set by the virtual camera setting means. The right texture area setting means sets, as a right texture area, an area in the real image for a right eye that corresponds to a predetermined virtual model in the virtual space when the area is looked at from the right virtual camera set by the virtual camera setting means. The left virtual camera image obtaining means applies an image included in the left texture area set by the left texture area setting means, to a drawing model that is the same as the virtual model or has a predetermined relationship with the virtual camera, and obtains a left virtual camera image of the drawing model shot by the left virtual camera. The right virtual camera image obtaining means applies an image included in the right texture area set by the right texture area setting means, to the drawing model, and obtains a right virtual camera image of the drawing model shot by the right virtual camera. The display control means displays the left virtual camera image and the right virtual camera image on the display means such that the left virtual camera image is viewed by the left eye of a user and the right virtual camera image is viewed by the right eye of the user.

The virtual camera setting means may set the left virtual camera, based on relative positions and relative orientations of a predetermined subject present in the real space and the real camera for a left eye with respect to each other. That is, the virtual camera setting means may set the left virtual camera, based on the position and orientation of the real camera for a left eye relative to a predetermined subject present in the real space, or based on the position and orientation of a predetermined subject present in the real space relative to the real camera for a left eye. Alternatively, the virtual camera setting means may set the left virtual camera, based on the absolute position and the absolute orientation of the left real camera detected by means for detecting an absolute position (for example, a GPS), and orientation detection means (for example, an angular velocity sensor, an acceleration sensor, or means for detecting a geomagnetism). In the same manner, the virtual camera setting means may set the right virtual camera, based on relative positions and relative orientations of a predetermined subject present in the real space and the real camera for a right eye with respect to each other, or based on the absolute position and the absolute orientation of the right real camera.

According to the above configuration, it is possible to apply each of the real image for a left eye and the real image for a right eye as textures to the virtual model, and to stereoscopically display the virtual model. Also, it is possible to vary a display manner of the virtual model depending on the obtained real images. In addition, since each of the real image for a left eye and the real image for a right eye is used as textures, it is possible to generate the left virtual camera image and the right virtual camera image without reducing the resolution in comparison with the case where one of the real images is used.

In another aspect of the illustrative embodiments, the left texture area setting means may set, as a left texture area, an area corresponding to the position and the contour of the virtual model in a rendered image obtained by shooting the virtual model by the left virtual camera. The right texture area setting means may set, as a right texture area, an area corresponding to the position and the contour of the virtual model in a rendered image obtained by shooting the virtual model by the right virtual camera.

According to the above configuration, it is possible to set, as a texture area, an area corresponding to the position and the contour of the virtual model in an image obtained by shooting the virtual model by each virtual camera.

In another aspect of the illustrative embodiments, the information processing program may further cause the computer to function as superimposed image generation means for generating a superimposed image for a left eye obtained by superimposing the left virtual camera image onto the real image for a left eye, and a superimposed image for a right eye obtained by superimposing the right virtual camera image onto the real image for a right eye. Then, the display control means displays the superimposed image for a left eye and the superimposed image for a right eye on the display means.

According to the above configuration, it is possible to display a superimposed image including the real image for a left eye, and the left virtual camera image obtained by shooting the virtual model, and a superimposed image including the real image for a right eye, and the right virtual camera image obtained by shooting the virtual model.

In another aspect of the illustrative embodiments, the information processing program may further cause the computer to function as deformation object setting means for generating a deformation object into which the virtual model is deformed, and setting the deformation object in the virtual space. The left virtual camera image obtaining means applies an image included in the left texture area set by the left texture area setting means, to the deformation object, and obtains the left virtual camera image of the deformation object shot by the left virtual camera. The right virtual camera image obtaining means applies an image included in the right texture area set by the right texture area setting means, to the deformation object, and obtains the right virtual camera image of the deformation object shot by the right virtual camera.

According to the above configuration, it is possible to 3-dimensionally vary a shot image of the real space. For example, by deforming a virtual model on a plane, an image including a plane, in the real world, that has been deformed can be displayed.

In another aspect of the illustrative embodiments, the virtual model may have a planar shape or a curved-surface shape, and may be set in the virtual space so as to follow the shape of a plane or a curved surface in the real space. The deformation object setting means generates the deformation object into which the virtual model having a planar shape or a curved-surface shape, and sets the deformation object in the virtual space.

According to the above configuration, it is possible to display a scene in which a plane or a curved surface in the real space varies 3-dimensionally.

In another aspect of the illustrative embodiments, the deformation object setting means may generate the deformation object into which the virtual model is deformed without its end portion being deformed.

According to the above configuration, when the virtual camera image is superimposed onto the real image, the resultant image does not provide a feeling of strangeness at the boundary of the deformation object.

In another aspect of the illustrative embodiments, the information processing program may further cause the computer to function as second object setting means for setting a second object different from the deformation object in the virtual space such that the second object has a predetermined position relationship with the deformation object. The left virtual camera image obtaining means obtains a left virtual camera image including the deformation object and the second object shot by the left virtual camera. The right virtual camera image obtaining means obtains a right virtual camera image of the deformation object and the second object shot by the right virtual camera.

According to the above configuration, the second object is set in the virtual space so as to have a predetermined position relationship with the deformation object, and an image obtained by superimposing an image of the second object in the virtual space onto an image of the real space that has been deformed, is displayed. Therefore, the second object appears to actually exist having the predetermined position relationship with the deformed portion in the real space. For example, it is possible to display a water surface that is heaving as a result of deformation of a plane in the real space, and a fish present in water.

In another aspect of the illustrative embodiments, the second object may be placed so as to be away from the deformation object in the shooting direction of each of the left virtual camera and the right virtual camera. The information processing program may further cause the computer to function as mask object setting means for setting a predetermined mask object for masking the second object, at an end portion of the deformation object.

According to the above configuration, when the virtual camera is set at a position where the second object is not visible via the deformation object (when the second object is shot from an oblique direction), the second object is masked.

In another aspect of the illustrative embodiments, the left real camera and the right real camera may shoot a marker, having a predetermined planar shape, that is placed in the real space. The virtual camera setting means may set the left virtual camera and the right virtual camera in the virtual space such that the left virtual camera and the right virtual camera are placed in accordance with the position and the orientation of the left real camera in the real space relative to the position and the orientation of the marker, and the position and the orientation of the right real camera in the real space relative to the position and the orientation of the marker. The virtual model may be a model, having a planar shape, that is placed on a plane on which the marker is placed, in the marker coordinate system set based on the marker. In addition, the information processing program may further cause the computer to function as deformation object setting means for generating the deformation object into which the virtual model is deformed, and setting the deformation object in the virtual space. The left virtual camera image obtaining means applies, as a texture, an image included in the left texture area set by the left texture area setting means, to the deformation object, and obtains a left virtual camera image of the deformation object shot by the left virtual camera. The right virtual camera image obtaining means applies, as a texture, an image included in the right texture area set by the right texture area setting means, to the deformation object, and obtains a right virtual camera image of the deformation object shot by the right virtual camera.

According to the above configuration, it is possible to stereoscopically display a scene in which a plane in the real space on which the marker is placed varies. As a result, for example, it is possible to display a scene in which the plane in the real world is heaving as a water surface.

In another aspect of the illustrative embodiments, the virtual camera setting means may detect a specific subject included in the real image for a left eye, obtain relative positions and relative orientations of the left real camera and the specific subject present in the real space with respect to each other, based on a result of the detection, and set the left virtual camera, based on the relative positions and the relative orientations. In addition, the virtual camera setting means may detect the specific subject included in the real image for a right eye, obtain relative positions and relative orientations of the right real camera and the specific subject present in the real space with respect to each other, based on a result of the detection, and set the right virtual camera, based on the relative positions and the relative orientations.

According to the above configuration, by shooting the specific subject, it is possible to place the left virtual camera and the right virtual camera such that the positions and the orientations of the left virtual camera and the right virtual camera correspond to the positions and the orientations of the left real camera and the right real camera in the real space, without using another component in addition to the left real camera and the right real camera.

In another aspect of the illustrative embodiments, the virtual model may be placed based on a position, in the virtual space, that corresponds to the position of the specific subject in the real space.

According to the above configuration, since the virtual model is placed at the position of the specific object, if the specific subject is shot, the virtual model can always be shot by the virtual camera.

The illustrative embodiments may be an information processing apparatus that realizes the above means. Alternatively, the illustrative embodiments may be an information processing system including a plurality of components that realize the above means and operate in a coordinated manner. The information processing system may include one apparatus, or may include a plurality of apparatuses.

According to the illustrative embodiments, it is possible to realize various expressions by using an image shot by a real camera, and a virtual model.

These and other objects, features, aspects and advantages of the illustrative embodiments will become more apparent from the following detailed description of the illustrative embodiments when taken in conjunction with the accompanying drawings.

BRIEF DESCRIPTION OF THE DRAWINGS

FIG. 12 shows a non-limiting exemplary position relationship between the marker 61 and an outer imaging section (left) 23a;

FIG. 15 shows texture coordinates T(i) of a vertex P(i);

DETAILED DESCRIPTION OF NON-LIMITING EXAMPLE EMBODIMENTS (Structure of Game Apparatus)

Figure 1:
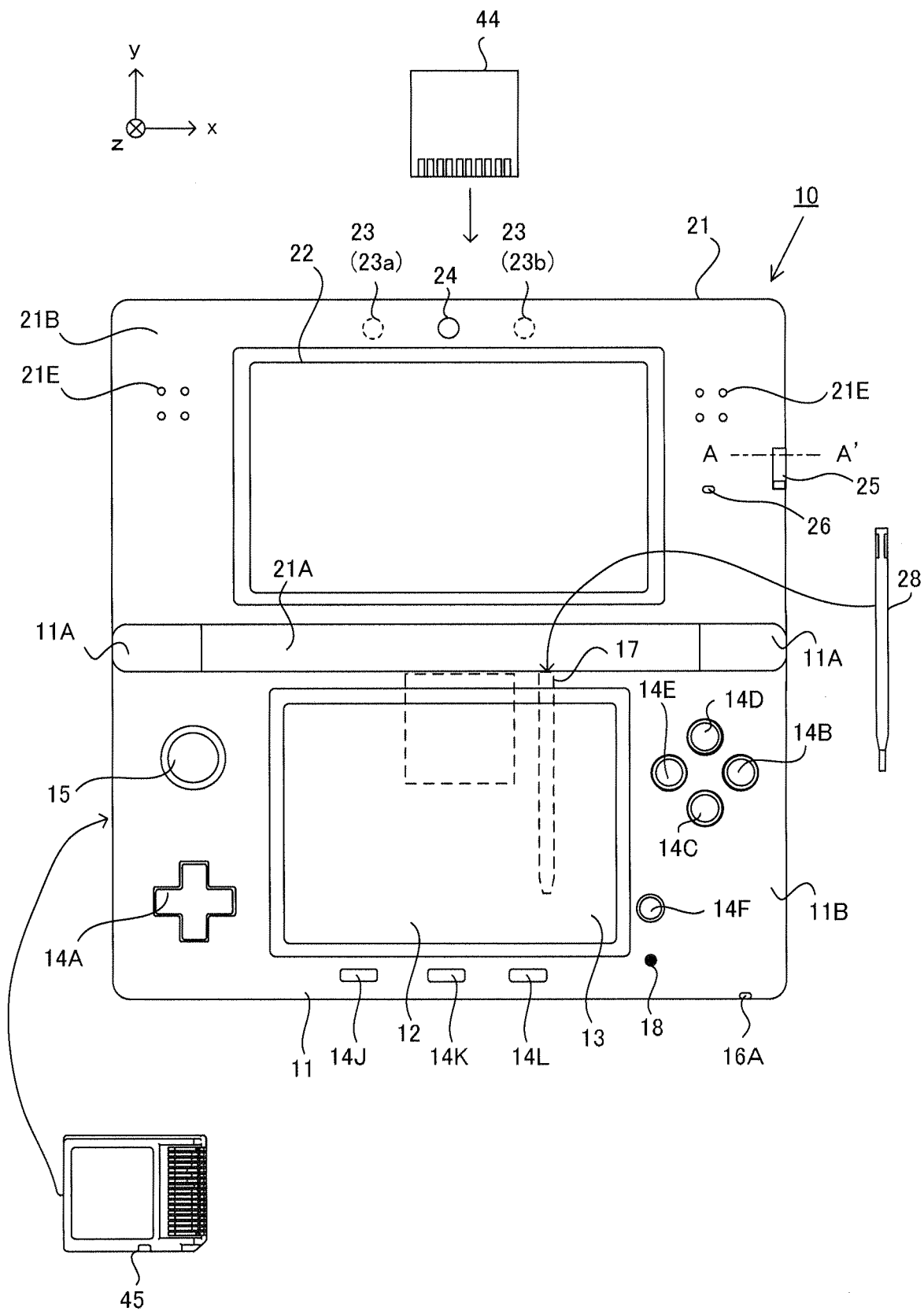
FIG. 1 is a front view of a game apparatus 10 in its opened state.
Figure 2:
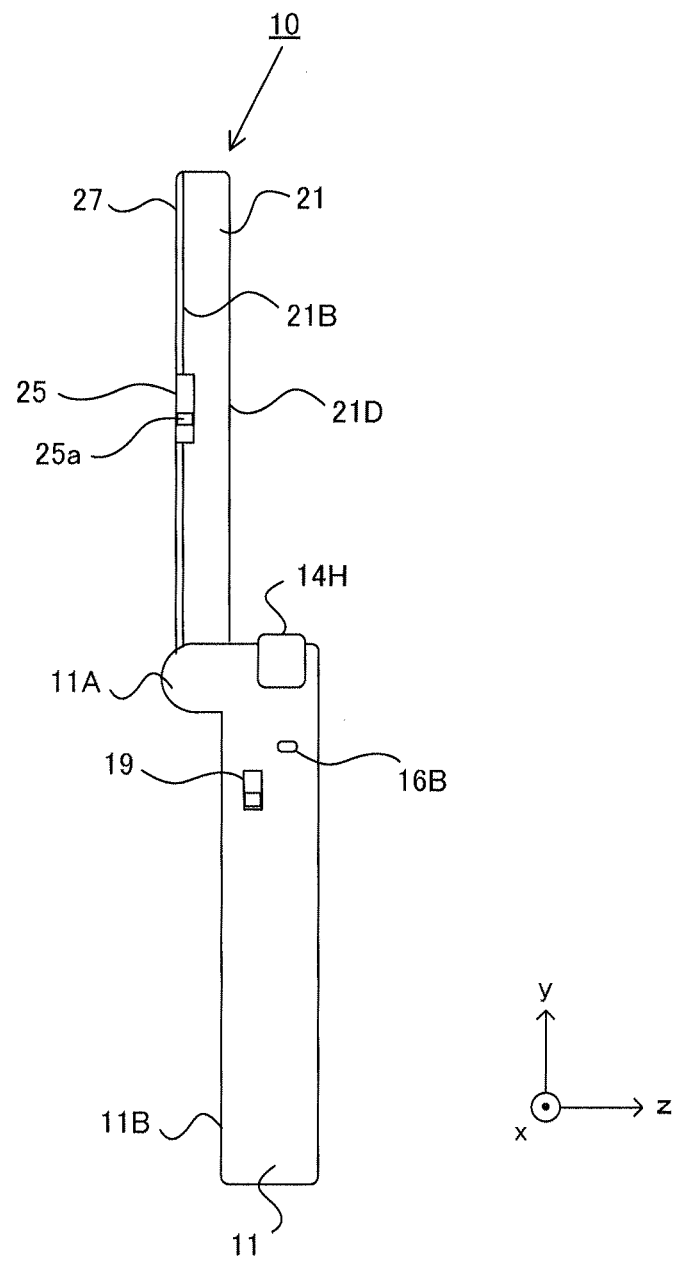
FIG. 2 is a right side view of the game apparatus 10 in its opened state.
Figure 3:
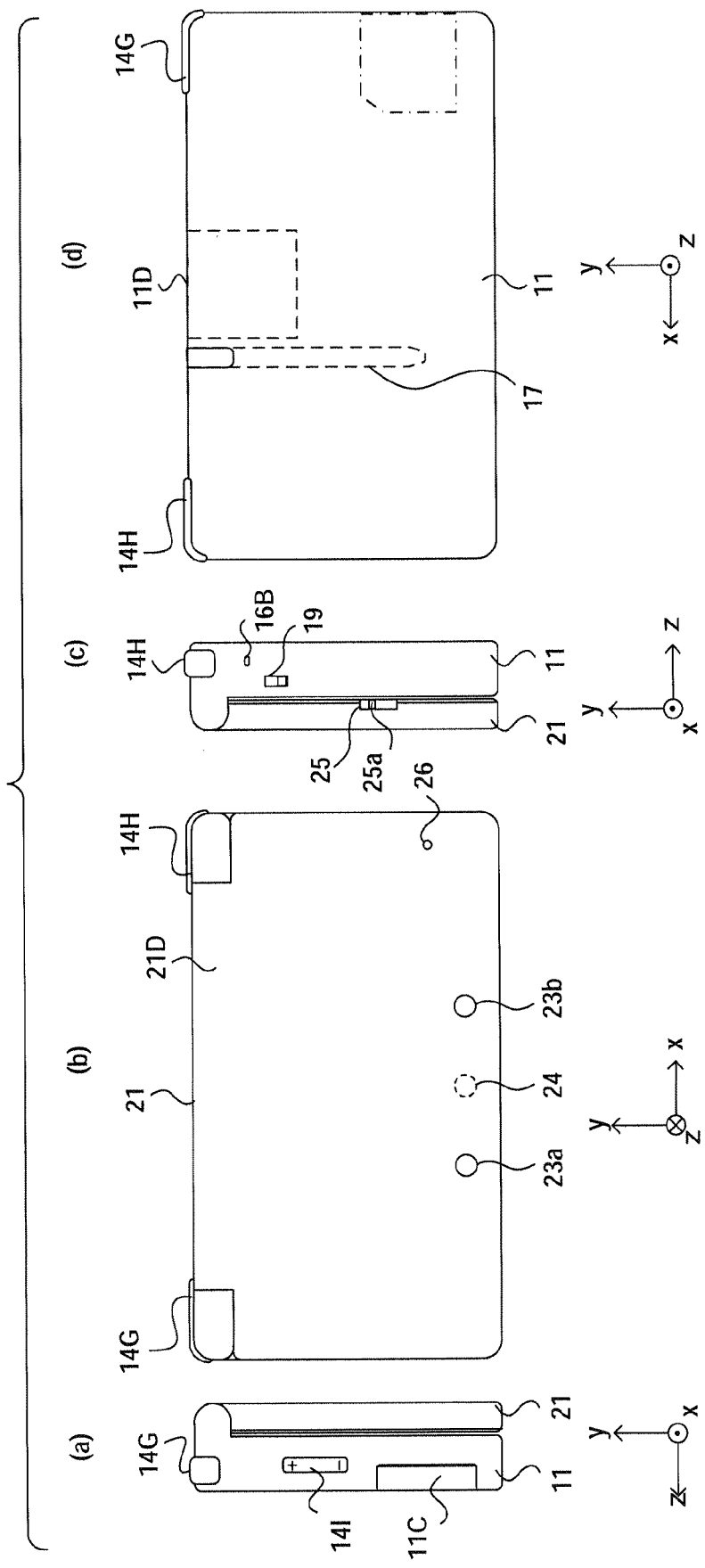
FIG. 3 shows a left side view, a front view, a right side view, and a rear view of the game apparatus 10 in its closed state.

Hereinafter, a game apparatus according to an illustrative embodiment will be described. FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to shoot an image by means of an imaging section, display the shot image on a screen, and store data of the shot image. The game apparatus 10 can execute a game program which is stored in an exchangeable memory card or a game program which is received from a server or another game apparatus, and can display, on the screen, an image generated by computer graphics processing, such as an image shot by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, besides the touch pen 28.

The operation buttons 14A to 14L are each an input device for making a predetermined input. As shown in FIG. 1, among operation buttons 14A to 14L, a cross button 14A (a direction input button 14A), an a-button 14B, a b-button 14C, an x-button 14D, a y-button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a 3-dimensional virtual space is executed by the game apparatus 10, the analog stick 15 acts as an input device for moving the predetermined object in the 3-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the a-button 14B, the b-button 14C, the x-button 14D, and the y-button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 4) is provided as a sound input device described below, and the microphone detects for a sound from the outside of the game apparatus 10.

FIG. 3(a) is a left side view of the game apparatus 10 in the closed state. FIG. 3(b) is a front view of the game apparatus 10 in the closed state. FIG. 3(c) is a right side view of the game apparatus 10 in the closed state. FIG. 3(d) is a rear view of the game apparatus 10 in the closed state. As shown in FIG. 3(b) and FIG. 3(d), an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. Further, as shown in FIG. 3(a), a sound volume button 14I is provided on the left side surface of the lower housing 11. The sound volume button 14I is used for adjusting a sound volume of a speaker of the game apparatus 10.

As shown in FIG. 3(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image shot by the game apparatus 10. The connector and the cover section 11C may be provided on the right side surface of the lower housing 11.

Further, as shown in FIG. 3(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image (also referred to as a stereoscopic view image or a stereoscopic image). Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described later.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images shot by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(b), the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a shoots an image for a left eye, which is viewed by a left eye of a user, and the outer imaging section (right) 23b shoots an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3(b), the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(b) represents the inner imaging section 24 positioned on the inner side surface of the upper housing 21.

As described above, the inner imaging section 24 is used for shooting an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can shoot an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (the height direction). A display mode of the upper LCD 22 may be determined or feeling of stereoscopic viewing may be adjusted, in accordance with the position of the slider 25a. For example, a cameras distance between virtual cameras (virtual stereo cameras) described later may be set in accordance with the position of the slider 25a of the 3D adjustment switch 25. In addition, the position relationship between an image for a left eye shot by a left virtual camera of the virtual stereo cameras, and an image for a right eye shot by a right virtual camera of the virtual stereo cameras, may be adjusted in accordance with the position of the slider 25a. Specifically, for example, if the slider 25a of the 3D adjustment switch 25 is positioned at the uppermost point (in the upward direction in FIG. 1 and FIG. 2), the difference, in the lateral direction (the longitudinal direction of the screen of the upper LCD 22, the right-left direction in FIG. 1), between the positions of the image for a left eye and the image for a right eye is set at the upper limit value. In this way, when the difference, in the lateral direction, between the positions of the image for a left eye and the image for a right eye has been set at the upper limit value, the parallax between the two images increases. Therefore, when the user views the two images displayed on the upper LCD 22 via the parallax barrier, the images appear to protrude toward the user from the screen of the upper LCD 22. In this way, the parallax between the two images may be adjusted by using the 3D adjustment switch 25.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described later.

(Internal Configuration of Game Apparatus 10)

Figure 4:
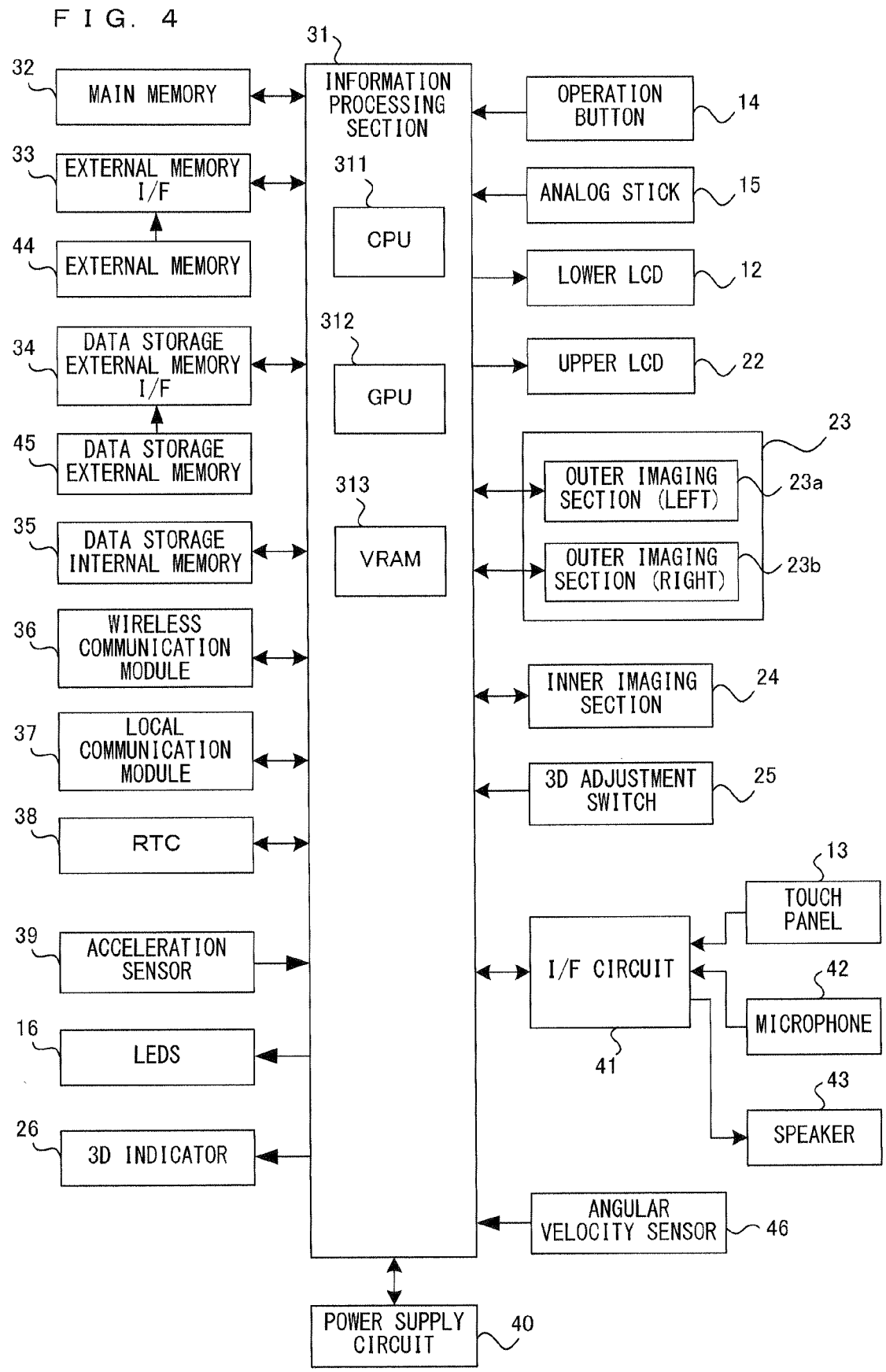
FIG. 4 is a non-limiting exemplary block diagram illustrating an internal configuration of the game apparatus 10.

Next, an internal electrical configuration of the game apparatus 10 will be described with reference to FIG. 4. FIG. 4 is a block diagram illustrating an internal configuration of the game apparatus 10. As shown in FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes an image processing (FIG. 12) described later by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the image processing, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined processing is performed by the program loaded by the information processing section 31 being executed. The external data storage memory 45 is implemented as a non-volatile readable and writable memory (for example, a NAND flash memory), and is used for storing predetermined data. For example, images shot by the outer imaging section 23 and/or images shot by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10. In the present embodiment, the information processing section 31 the orientation (inclination) of the game apparatus 10, based on the acceleration detected by the acceleration sensor 39.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform processing in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each shoot an image in accordance with an instruction from the information processing section 31, and output data of the shot image to the information processing section 31. For example, the information processing section 31 issues an instruction for shooting an image to one of the outer imaging section 23 or the inner imaging section 24, and the imaging section which receives the instruction for shooting an image shoots an image and transmits data of the shot image to the information processing section 31. For example, in the present embodiment, a user selects the imaging section to be used through a touch operation using the touch panel 13. When the information processing section 31 (the CPU 311) detects that the imaging section is selected, the information processing section 31 instructs one of the outer imaging section 32 or the inner imaging section 24 to shoot an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

In addition, the angular velocity sensor 46 is connected to the information processing section 31. The angular velocity sensor 46 detects angular velocities about the respective axes (x-axis, y-axis, and z-axis). The game apparatus 10 can calculate the orientation of the game apparatus 10 in the real space, based on the angular velocities sequentially detected by the angular velocity sensor 46. Specifically, the game apparatus 10 integrates the angular velocities about the respective axes detected by the angular velocity sensor 46 with respect to time, thereby calculating the rotation angles of the game apparatus 10 about the respective axes.

(Outline of Game Processing)

Next, the outline of a game executed by the game apparatus 10 according to the present embodiment will be described. In the game according to the present embodiment, when a marker is placed on a plane (for example, a table) in the real space, and then the marker is shot by the outer imaging section 23, a fishing rod and a fish which is a virtual object are superimposed onto a real image obtained by shooting a real space, and the resultant image is displayed on the upper LCD 22. Then, if the user performs a predetermined operation, a scene in which an end portion of a fishing line comes into contact with the plane in the real space and the plane heaves is displayed on the upper LCD 22. Hereinafter, first, an image displayed on the game apparatus 10 will be described, and then processing of displaying the plane in the real space heaving will be described.

Figure 5:
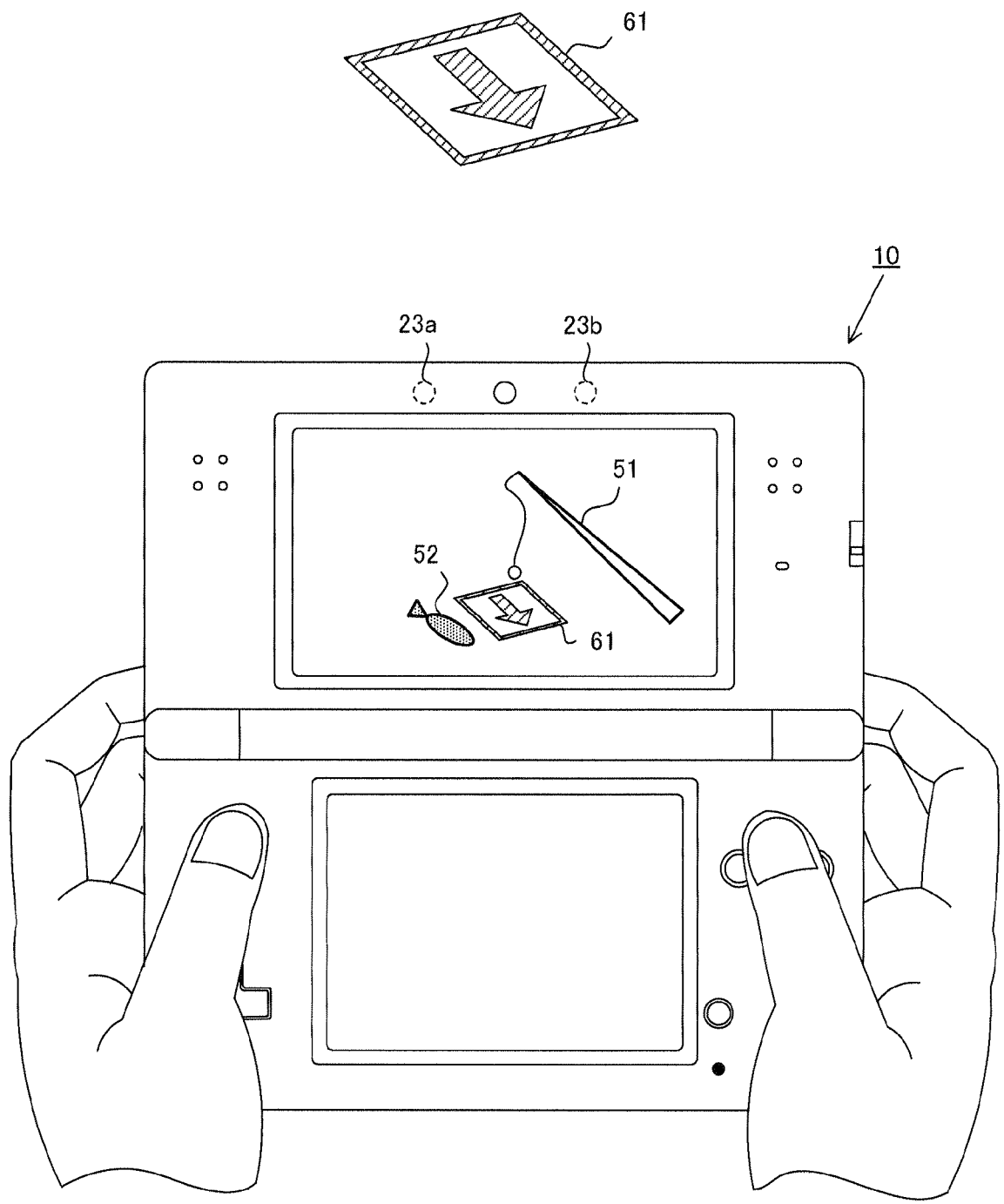
FIG. 5 shows a non-limiting example of an image displayed on an upper LCD 22 when a marker 61 which is placed in advance in the real space is shot by an outer imaging section 23, while game processing according to an illustrative embodiment is being executed.

FIG. 5 shows an example of an image displayed on the upper LCD 22 when a marker 61 which is placed in advance in the real space is shot by the outer imaging section 23, while the game according to the present embodiment is being executed.

As shown in FIG. 5, the marker 61 is placed on the plane (a table or the like, which is not shown) in the real space, and in the shooting direction of the outer imaging section 23. The marker 61 is a piece of paper that is rectangular-shaped, and an arrow is drawn at the center of the marker 61. The direction of the arrow drawn at the center of the marker 61 is in parallel with the longitudinal sides of the marker 61. The information processing section 31 (CPU 311) of the game apparatus 10 performs image processing such as pattern matching for an image shot by the outer imaging section 23, thereby detecting the marker 61 in the shot image. When the marker 61 has been detected in the image shot by the outer imaging section 23, a fishing rod object 51 and a fish object 52 are displayed on the upper LCD 22. Specifically, when the marker 61 has been detected, the fishing rod object 51 and the fish object 52 are superimposed onto a real image (a shot image of the real space including the marker 61 and the background) shot by the outer imaging section 23, and the resultant image is displayed on the upper LCD 22. When the marker 61 has not been detected in the image shot by the outer imaging section 23, a message indicating that the marker 61 has not been detected is displayed on the upper LCD 22, and the fishing rod object 51 is not displayed.

The outer imaging section 23 shoots a real image for a left eye to be viewed by the left eye of the user, and a real image for a right eye to be viewed by the right eye of the user, and the two real images that have been shot are displayed on the upper LCD 22. Therefore, the image displayed on the upper LCD 22 shown in FIG. 5 includes stereoscopically visible images (stereoscopic images).

In the state where the image shown in FIG. 5 is displayed on the upper LCD 22, when the user performs a predetermined operation, the image indicating a scene in which an end portion of a fishing line of the fishing rod object 51 moves downward to come into contact with the plane on which the marker 61 is placed, and then the plane heaves, is displayed. The predetermined operation is, for example, an operation of moving the outer imaging section 23 of the game apparatus 10 toward the marker 61, or an operation of inclining the game apparatus 10 so as to be in parallel with the plane on which the marker 61 is placed.

Figure 6:
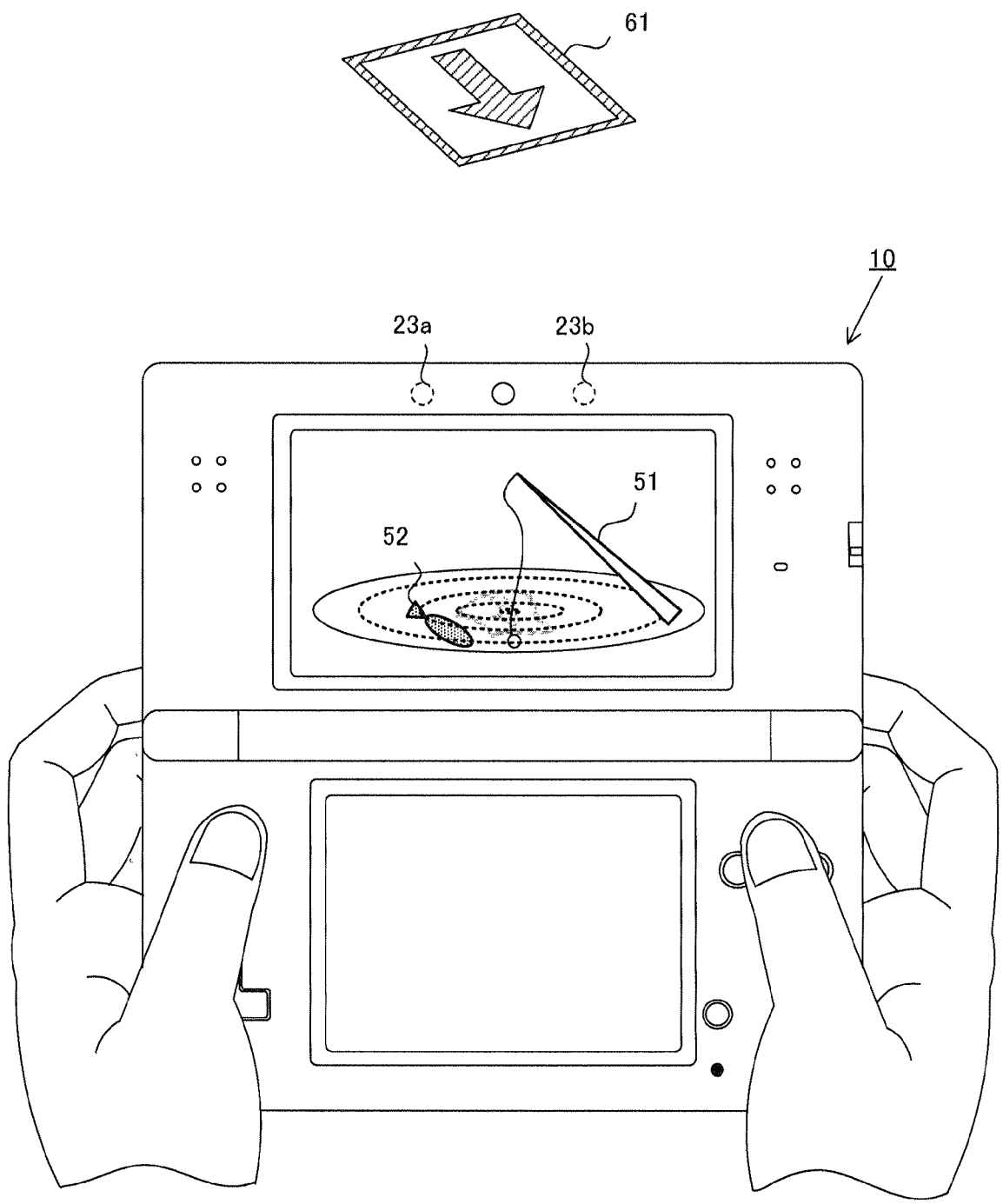
FIG. 6 shows a non-limiting exemplary scene in which a plane on which the marker 61 is placed is heaving when the user has performed a predetermined operation.

FIG. 6 shows a scene in which the plane on which the marker 61 is placed is heaving when the user has performed the predetermined operation. As shown in FIG. 6, when the user has performed the predetermined operation, an image in which the plane in the real space on which the marker 61 is placed is heaving is displayed on the upper LCD 22. Specifically, a real image for a left eye and a real image for a right eye are shot by the outer imaging section 23, and the two real images that have been shot are deformed, whereby the plane in the real space stereoscopically heaving is displayed.

Figure 7:
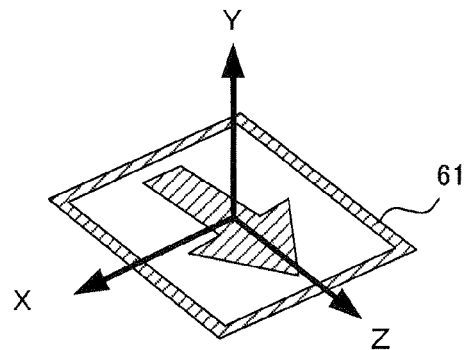
FIG. 7 shows a non-limiting example of the definition of a marker coordinate system.

It is noted that a marker coordinate system is set for the marker 61. FIG. 7 shows a definition of the marker coordinate system. As shown in FIG. 7, the marker coordinate system is defined as an XYZ coordinate system whose origin is at the center of the marker 61. A Z-axis is set in the same direction (forward direction) as the direction of the arrow of the marker 61, an X-axis is set rightward (in the rightward direction) with respect to the direction of the arrow, and a Y-axis is set vertically and upward (in the upward direction) with respect to the marker 61. In this way, a coordinate system (the marker coordinate system) in a virtual space is defined based on the marker 61 placed in the real space, thereby associating the virtual space with the real space.

The fish object 52 is set in the virtual space defined by the marker coordinate system. Therefore, when the position or the orientation of the game apparatus 10 (outer imaging section 23) is changed, a manner in which the fish object 52 is visible also changes. For example, when the user turns the game apparatus 10 90 degrees around the marker 61 (turns the game apparatus 10 90 degrees around the Y-axis), the fish object 52 is displayed so as to turn 90 degrees. Therefore, the user can feel as if the fish object 52 were present in the real space. It is noted that even if the position of the game apparatus 10 is changed, the fishing rod object 51 does not change (as the user holds the fishing rod object 51, the position of the fishing rod object 51 in the virtual space changes in accordance with the position of the user in the real space).

Hereinafter, processing for displaying the above-described image, which is executed on the game apparatus 10, will be described in detail.

(Details of Game Processing)

Figure 8:
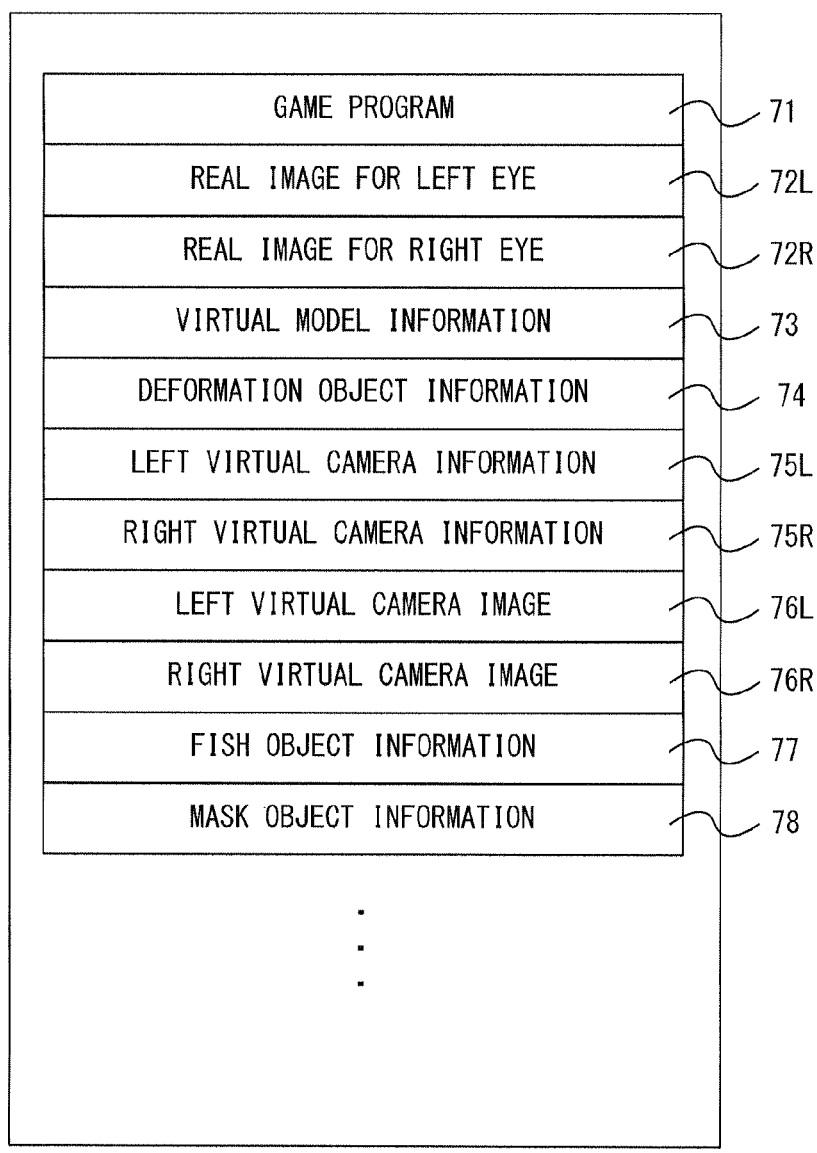
FIG. 8 shows a non-limiting exemplary memory map of a RAM of the game apparatus 10.

Next, with reference to FIG. 8 to FIG. 11, the details of display processing according to the present embodiment will be described. First, main data to be stored in the main memory 32 and the VRAM 313 (which, hereinafter, may be collectively referred to as a RAM) in the display processing will be described. FIG. 8 shows a memory map of the RAM of the game apparatus 10. As shown in FIG. 8, the RAM stores a game program 71, a real image for a left eye 72L, a real image for a right eye 72R, virtual model information 73, deformed object information 74, left virtual camera information 75L, right virtual camera information 75R, a left virtual camera image 76L, a right virtual camera image 76R, fish object information 77, mask object information 78, and the like.

The game program 71 is a program for causing the information processing section 31 (CPU 311) to execute game processing shown in flowcharts described later.

The real image for a left eye 72L is an image of the real space shot by the outer imaging section (left) 23a.

The real image for a right eye 72R is an image of the real space shot by the outer imaging section (right) 23b.

The virtual model information 73 is information relevant to a virtual model 55 (see FIG. 13) described later. Specifically, the virtual model information 73 is data representing a polygon having a planar shape, and indicates vertices P(i) (i=1 to n). As described later, the points P included in the virtual model 55 are represented by coordinate values in the marker coordinate system.

The deformed object information 74 is information relevant to a deformation object 56 (see FIG. 14) into which the virtual model 55 having a planar shape is deformed. Specifically, the deformed object information 74 indicates vertices Q(i) (i=1 to n), and normal vectors N(i) of the vertices Q(i). The points Q included in the deformation object 56 are represented by coordinate values in the marker coordinate system.

The left virtual camera information 75L indicates the position and the orientation of a left virtual camera 53a (see FIG. 12) in the virtual space. Specifically, the left virtual camera information 75L is a matrix calculated based on the position and the orientation of the marker 61 in the real image for a left eye 72L.

The right virtual camera information 75R indicates the position and the orientation of a right virtual camera 53b (see FIG. 12) in the virtual space. Specifically, the right virtual camera information 75R is a matrix calculated based on the position and the orientation of the marker 61 in the real image for a right eye 72R.

The left virtual camera image 76L is an image obtained by the left virtual camera 53a shooting the deformation object 56.

The right virtual camera image 76R is an image obtained by the right virtual camera 53b shooting the deformation object 56.

The fish object information 77 is information relevant to the fish object 52 placed in the virtual space, and indicates the position and the shape of the fish object 52.

The mask object information 78 is information relevant to a mask object 57 (see FIG. 20) for masking the fish object 52 placed in the virtual space such that the fish object 52 is not visible from a predetermined direction.

(Description of Main Flow)

Figure 9:
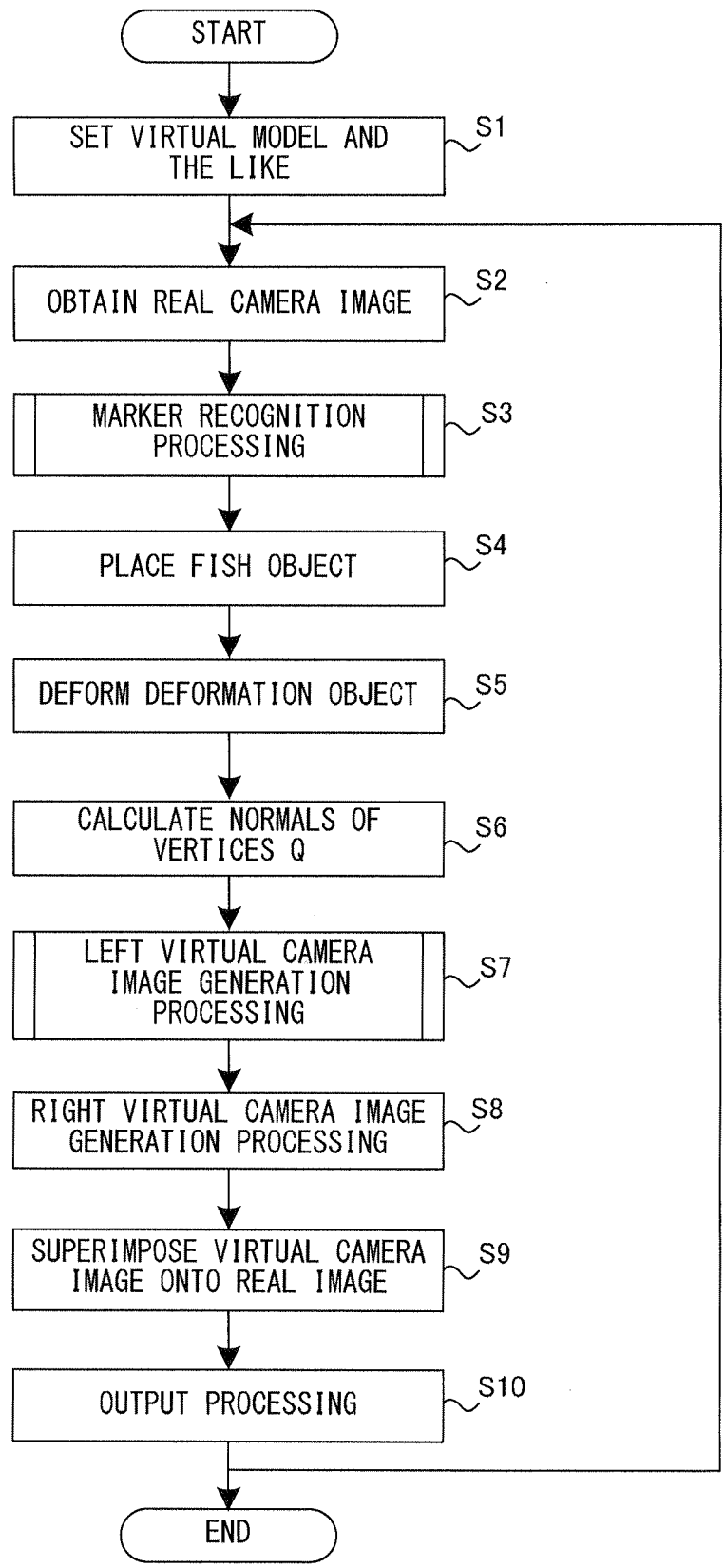
FIG. 9 is a non-limiting exemplary main flowchart showing the details of the game processing according to the embodiment.

Next, the details of the game processing according to the present embodiment will be described with reference to FIG. 9 to FIG. 11. FIG. 9 is a main flowchart showing the detail of the game processing according to the present embodiment. When the game apparatus 10 is powered on, the information processing section 31 (CPU 311) of the game apparatus 10 executes a boot program stored in a ROM, which is not shown, thereby initializing units such as the main memory 32. Next, a game program stored in a non-volatile memory (external memory 44 or the like, a computer-readable storage medium) is loaded onto a RAM (specifically, the main memory 32), and then the CPU 311 of the information processing section 31 starts to execute the game program. After the above processing is finished, processing indicated by the flowchart in FIG. 9 is executed by the information processing section 31 (the CPU 311 or the GPU 312).

It is noted that in FIG. 9, processing that is not directly relevant to the illustrative embodiment is omitted. In addition, FIG. 9 will be described under the assumption that the marker 61 present in the real space has been shot by the outer imaging section 23. In addition, a loop of processing from step S2 to step S10 in FIG. 9 is repeated every frame (for example, 1/30 second or 1/60 second, which is referred to as a frame time).

First, in step S1, the information processing section 31 sets the virtual model 55 and the like. Specifically, the information processing section 31 sets the coordinates of the points P representing the virtual model 55 (in the marker coordinate system) at predetermined values, and stores the values in the RAM. Specifically, the points P are set on the XZ-plane in the marker coordinate system. In addition, the information processing section 31 sets the coordinates of the points Q representing the deformation object 56 at predetermined values (the same values as those of the points P), and stores the values in the RAM. In addition, the information processing section 31 sets the mask object 57 at an end portion of the virtual model 55.

Figure 13:
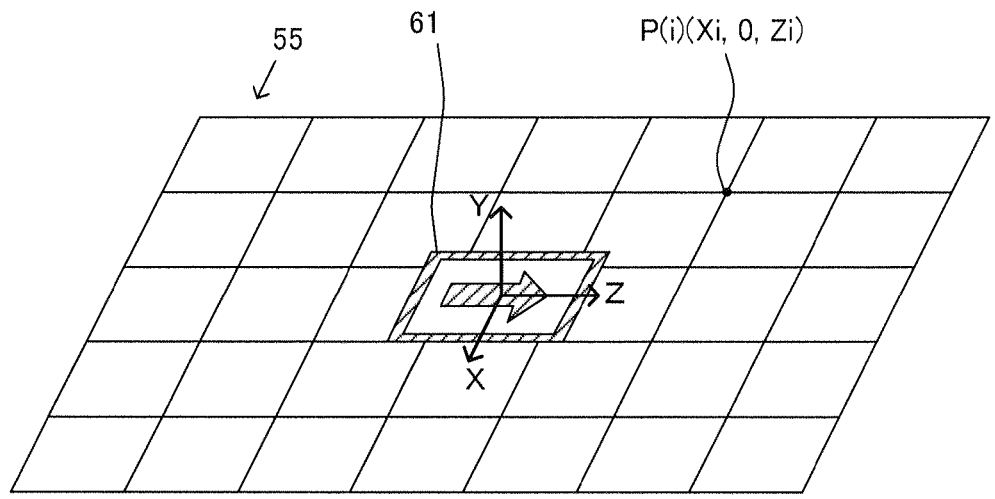
FIG. 13 shows a virtual model 55.

FIG. 13 shows the virtual model 55. As shown in FIG. 13, the virtual model 55 is a polygon including n vertices P and having a planar shape, and is placed on the XZ-plane (the plane in the real space on which the marker 61 is placed) in the marker coordinate system (XYZ coordinate system). After step S1, the information processing section 31 executes processing of step S2.

In step S2, the information processing section 31 obtains a real camera image. Specifically, the information processing section 31 obtains the real image for a left eye 72L shot by the outer imaging section (left) 23a, and stores the obtained image in the RAM. In addition, the information processing section 31 obtains the real image for a right eye 72R shot by the outer imaging section (right) 23b, and stores the obtained image in the RAM. Next, the information processing section 31 executes processing of step S3.

In step S3, the information processing section 31 executes marker recognition processing. The marker recognition processing is processing of recognizing the marker 61 included in the real image for a left eye 72L and the real image for a right eye 72R obtained in step S2, and setting virtual cameras (the left virtual camera 53a and the right virtual camera 53b). The details of the marker recognition processing in step S3 will be described with reference to FIG. 10.

Figure 10:
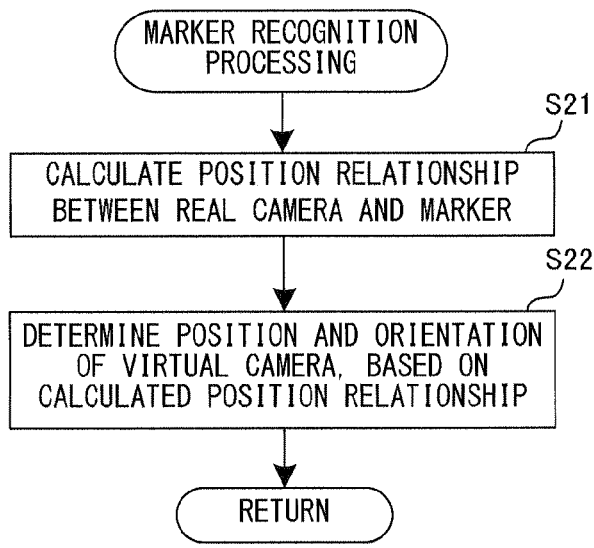
FIG. 10 is a non-limiting exemplary flowchart showing the details of marker recognition processing (step S3)

FIG. 10 is a flowchart showing the details of the marker recognition processing (step S3).

In step S21, the information processing section 31 calculates a position relationship between a real camera and a marker. Specifically, first, the information processing section 31 recognizes a marker included in the real image for a left eye 72L by a pattern matching method or the like. Then, the information processing section 31 calculates the position relationship between the outer imaging section (left) 23a and the marker 61 present in the real space, based on the position, size, and shape of the marker in the real image for a left eye 72L, the direction of an arrow in the marker, and the like. Here, the position relationship between the outer imaging section (left) 23a and the marker 61 is the 3-dimensional position and the 3-dimensional orientation of one of the marker 61 and the outer imaging section (left) 23a relative to the other one.

Figure 12:
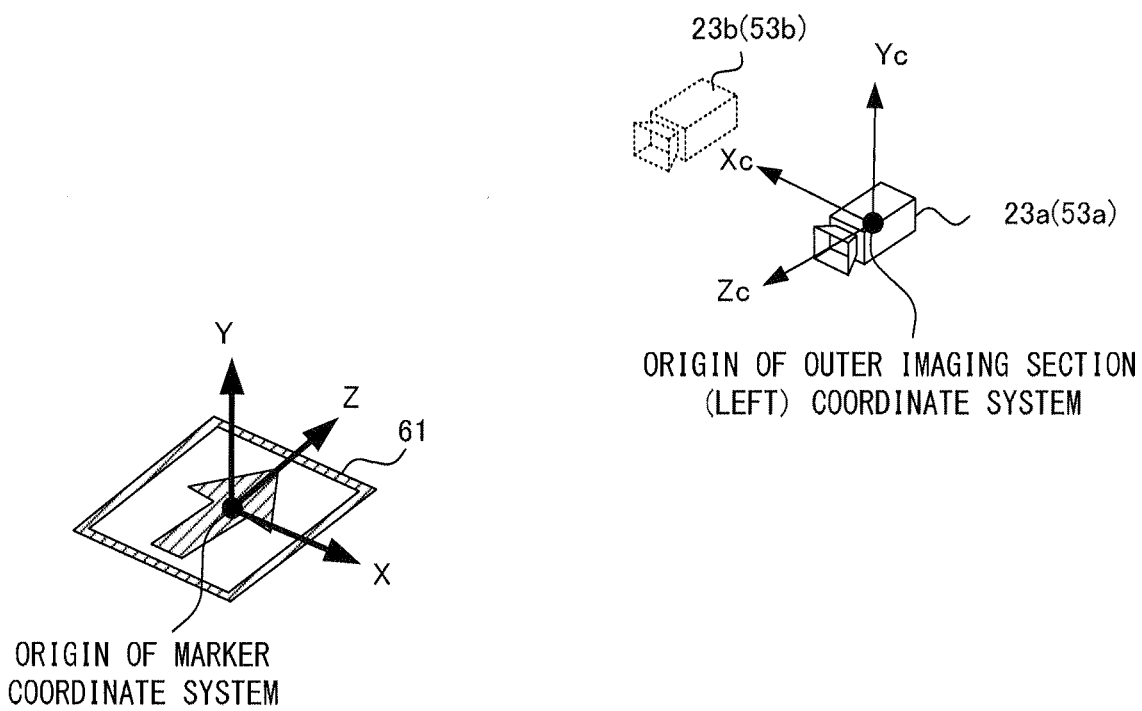

FIG. 12 shows the position relationship between the marker 61 and the outer imaging section (left) 23a. As shown in FIG. 12, the position relationship is the relative position and relative orientation of the outer imaging section (left) 23a with respect to the marker 61. In the same manner, the information processing section 31 calculates the position relationship between the outer imaging section (right) 23b, and the marker 61 present in the real space, by using the real image for a right eye 72R. Here, a matrix indicating the relative position and relative orientation of the outer imaging section (left) 23a with respect to the marker 61, and a matrix indicating the relative position and relative orientation of the outer imaging section (right) 23b with respect to the marker 61, are calculated.

More specifically, in step S21, the marker coordinate system is set based on a result of the recognition of the marker, and the position relationship between the marker 61 and the outer imaging section (left) 23a are calculated (see FIG. 12). As shown in FIG. 12, the origin of the marker coordinate system is set at the center of the marker 61. In addition, the Z-axis of the marker coordinate system is set in parallel with the direction of the arrow of the marker 61 (that is, set in parallel with the longitudinal sides of the marker 61), and the X-axis of the marker coordinate system is set in the direction that is perpendicular and rightward with respect to the direction of the arrow (that is, set in parallel with the short sides of the marker 61). In addition, the Y-axis is set vertically and upward with respect to the marker 61 (that is, set upward in the normal direction of the rectangular marker 61). The marker coordinate system is a coordinate system for defining the virtual space, and associating the virtual space with the real space. That is, the origin of the marker coordinate system coincides with the origin of the virtual space, and also with the center of the marker 61 in the real space.

Then, a matrix indicating the relative position and relative orientation of the outer imaging section (left) 23a with respect to the marker 61 is calculated. As shown in FIG. 12, the matrix indicating the position and orientation of the outer imaging section (left) 23a is a coordinate transform matrix that transforms coordinates represented in the marker coordinate system in the virtual space, into coordinates represented in an outer imaging section (left) coordinate system based on the position and the orientation of the outer imaging section (left) 23a. In step S21, the matrix indicating the position and orientation of the outer imaging section (left) 23a is calculated based on the marker in the real image for a left eye 72L, and a matrix indicating the position and orientation of the outer imaging section (right) 23b is calculated based on the marker in the real image for a right eye 72R.

It is noted that the outer imaging section (left) 23a and the outer imaging section (right) 23b are provided such that the shooting directions thereof are in parallel with each other and the outer imaging section (left) 23a and the outer imaging section (right) 23b do not rotate with respect to the shooting directions. That is, the orientation of the outer imaging section (left) 23a and the orientation of the outer imaging section (right) 23b always coincide with each other. In addition, the outer imaging section (left) 23a and the outer imaging section (right) 23b are provided being separated by a predetermined interval. Therefore, under the assumption that there is no error in the attachment of the outer imaging section (left) 23a and the outer imaging section (right) 23b, if, for example, the position and the orientation of the outer imaging section (left) 23a is calculated based on the real image for a left eye 72L, it is possible to calculate the position and the orientation of the outer imaging section (right) 23b without using the real image for a right eye 72R. In addition, in order to consider error in the attachment of the outer imaging section (left) 23a and the outer imaging section (right) 23b, the position and the orientation of the outer imaging section (left) 23a may be calculated based on the real image for a left eye 72L, and the position and the orientation of the outer imaging section (right) 23b may be calculated based on the real image for a right eye 72R, thereby obtaining the error. For example, the positions and the like of the outer imaging section (left) 23a and the outer imaging section (right) 23b may be respectively calculated based on the real image for a left eye 72L and the real image for a right eye 72R during a certain time period, to calculate the error. Then, the position and the orientation of the outer imaging section (left) 23a may be calculated by using the real image for a left eye 72L (or the real image for a right eye 72R), and the position and the orientation of the outer imaging section (right) 23b may be calculated based on the calculated error, and the calculated position and orientation of the outer imaging section (left) 23a. After step S21, the information processing section 31 executes processing of step S22.

In step S22, the information processing section 31 determines the positions and the orientations of the left virtual camera and the right virtual camera. Here, the positions and the orientations of the left virtual camera and the right virtual camera coincide with the respective positions and orientations of the outer imaging section 23. That is, the position and the orientation of the left virtual camera 53a in the virtual space are set so as to coincide with the position and the orientation of the outer imaging section (left) 23a (see FIG. 12). The position and the orientation of the right virtual camera 53b in the virtual space are set so as to coincide with the position and the orientation of the outer imaging section (right) 23b. Specifically, the position and the orientation of the left virtual camera 53a are represented by a matrix (left view matrix). A matrix indicating the position and the orientation of the outer imaging section (left) 23a calculated in step S21 is stored as the left virtual camera information 75L, in the RAM. Similarly, the position and the orientation of the right virtual camera 53b are represented by a matrix (right view matrix). A matrix indicating the position and the orientation of the outer imaging section (right) 23b calculated in step S21 is stored as the right virtual camera information 75R, in the RAM. It is noted that since the orientation of the outer imaging section (left) 23a, and the orientation of the outer imaging section (right) 23b always coincide with each other as described above, the orientation of the left virtual camera 53a, and the orientation of the right virtual camera 53b also coincide with each other. After step S22, the information processing section 31 ends the marker recognition processing.

With reference to FIG. 9, the information processing section 31 executes processing of step S4, after step S3.

In step S4, the information processing section 31 sets the fish object 52 in the virtual space. Specifically, the information processing section 31 places the fish object 52 so as to be away from the virtual model 55 in the negative direction of the Y-axis. It is noted that the fish object 52 moves in the virtual space in accordance with a predetermined regularity. Next, the information processing section 31 executes processing of step S5.

Figure 14:
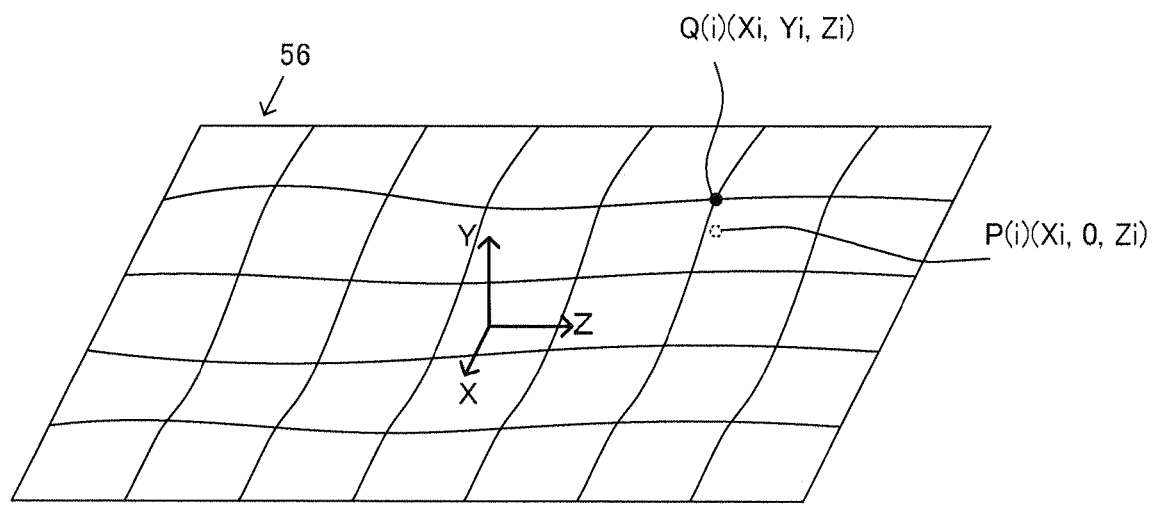
FIG. 14 shows a deformation object 56.

In step S5, the information processing section 31 deforms a deformation object. FIG. 14 shows the deformation object 56. The deformation object 56 is an object into which the virtual model 55 is deformed. As shown in FIG. 14, the deformation object 56 is generated when each of the points P of the virtual model 55 is moved in the upward or downward direction (positive or negative direction of the Y-axis) of the marker coordinate system. Specifically, the information processing section 31 moves the vertices Q(i) (i=1 to n) of the deformation object 56 in the upward or downward direction in accordance with a predetermined pattern. For example, the information processing section 31 determines a movement vector indicating the direction (positive or negative direction of the Y-axis) and the distance of a movement of each of the vertices Q, in accordance with the distance from a predetermined point to the vertex Q in the marker coordinate system. Then, the information processing section 31 adds the determined movement vectors to the respective current vertices Q, to move the vertices Q (update the coordinate values of the vertices Q and store the updated values in the RAM).

It is noted that in step S5, the information processing section 31 moves only points of the deformation object 56 other than points on its end portions. That is, the coordinates of vertices present at the boundary (circumference) of the deformation object 56 shown in FIG. 14 do not change. On the contrary, if the boundary of the deformation object 56 is deformed and the resultant deformation object 56 is shot by a virtual camera in step S7 or S8 described later, an image obtained by superimposing the image shot by the virtual camera onto a real image with each other can be unnatural because the consistency at the boundary is not maintained. Specifically, if the boundary of the deformation object 56 is greatly deformed, the image is discontinuous at the boundary because an area outside and in the vicinity of the boundary of the deformation object 56 is not deformed while the boundary of the deformation object 56 is deformed, whereby the image provides a feeling of strangeness. However, in the present embodiment, since the boundary of the deformation object 56 is not deformed, the image is natural even at the boundary.

Next, the information processing section 31 executes processing of step S6.

In step S6, the information processing section 31 calculates the normal of each of the vertices Q. Here, the information processing section 31 calculates the normal vectors N(i) of the vertices Q(i) updated in step S5, and stores the normal vectors N(i) in the RAM. Next, the information processing section 31 executes processing of step S7.

In step S7, the information processing section 31 executes left virtual camera image generation processing. The details of the left virtual camera image generation processing of step S7 will be described with reference to FIG. 11.

Figure 11:
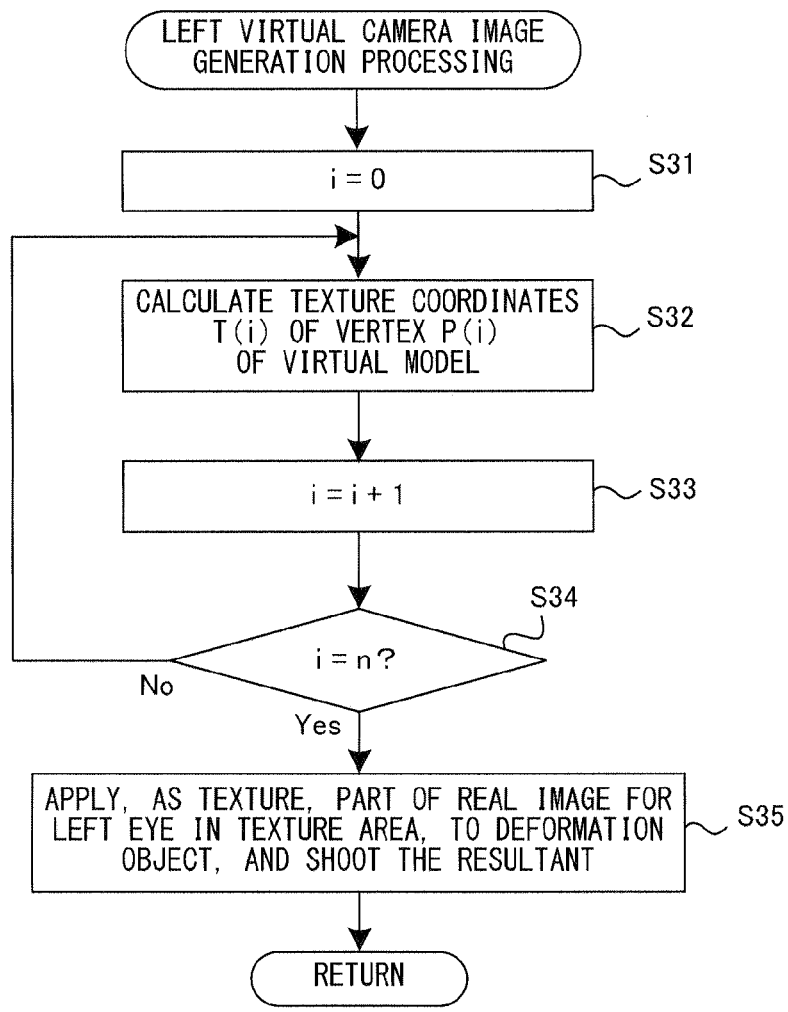
FIG. 11 is a non-limiting exemplary flowchart showing the details of left virtual camera image generation processing (step S7)

FIG. 11 is a flowchart showing the details of the left virtual camera image generation processing (step S7).

First, in step S31, the information processing section 31 sets the variable i at 0 and stores the variable in the RAM. Next, the information processing section 31 executes processing of step S32.

In step S32, the information processing section 31 calculates texture coordinates T(i) of the vertex P(i) of the virtual model 55. Here, the position (T(i)), in the real image for a left eye 72L, of the vertex P(i) (in the marker coordinate system) of the virtual model 55 which is placed in the virtual space is calculated.

FIG. 15 shows the texture coordinates T(i) of the vertex P(i). As shown in FIG. 15, the texture coordinates T(i) indicates a position in the real image for a left eye 72L. Specifically, the information processing section 31 multiplies the vertex P(i) of the virtual model 55 represented in the marker coordinate system, by the left view matrix for the left virtual camera 53a (a matrix calculated in step S3, the left virtual camera information 75L), and by a projection matrix, thereby obtaining coordinates on the display of the upper LCD 22 (coordinates in a coordinate system whose origin is the lower left end of the screen of the upper LCD 22). Then, the information processing section 31 performs predetermined transform processing for the coordinates on the display, thereby calculating the coordinates T(i) (position in a coordinate system whose origin is the lower left end of the real image for a left eye 72L) in the real image for a left eye 72L. As shown in FIG. 15, the size of the real image for a left eye 72L is larger than that of the upper LCD 22. Therefore, the texture coordinates T are obtained by transforming the coordinates on the display into coordinates in the real image for a left eye 72L (Tx-Ty coordinate system). Next, the information processing section 31 executes processing of step S33.

In step S33, the information processing section 31 increments the variable i, Next, the information processing section 31 executes processing of step S34.

In step S34, the information processing section 31 determines whether or not i is equal to n. If the result of the determination is positive, the information processing section 31 executes processing of step S35. If the result of the determination is negative, the information processing section 31 executes the processing of step S32 again. The texture coordinates T of all the vertices P of the virtual model 55 are obtained by the processing from steps S32 to S34 being repeatedly executed.

In step S35, the information processing section 31 applies, as a texture, to the deformation object 56, a part of the real image for a left eye 72L in an area corresponding to each set of the texture coordinates, and then shoots the resultant by the left virtual camera. Specifically, the information processing section 31 sets the respective sets of texture coordinates T(i) for the vertices Q(i) of the deformation object 56, maps textures thereto, and shoots the resultant by the left virtual camera 53a. Then, the information processing section 31 stores the shot image as the left virtual camera image 76L, in the RAM. The processing in step S35 corresponds to processing of cutting an image included in a left texture area corresponding to each set of the texture coordinates T calculated in the processing from steps S32 to S34, from the real image for a left eye 72L, and applying the image to the deformation object 56. Hereinafter, the outline of the processing of step S35 will be described with reference to FIG. 16 and FIG. 17.

Figure 16:
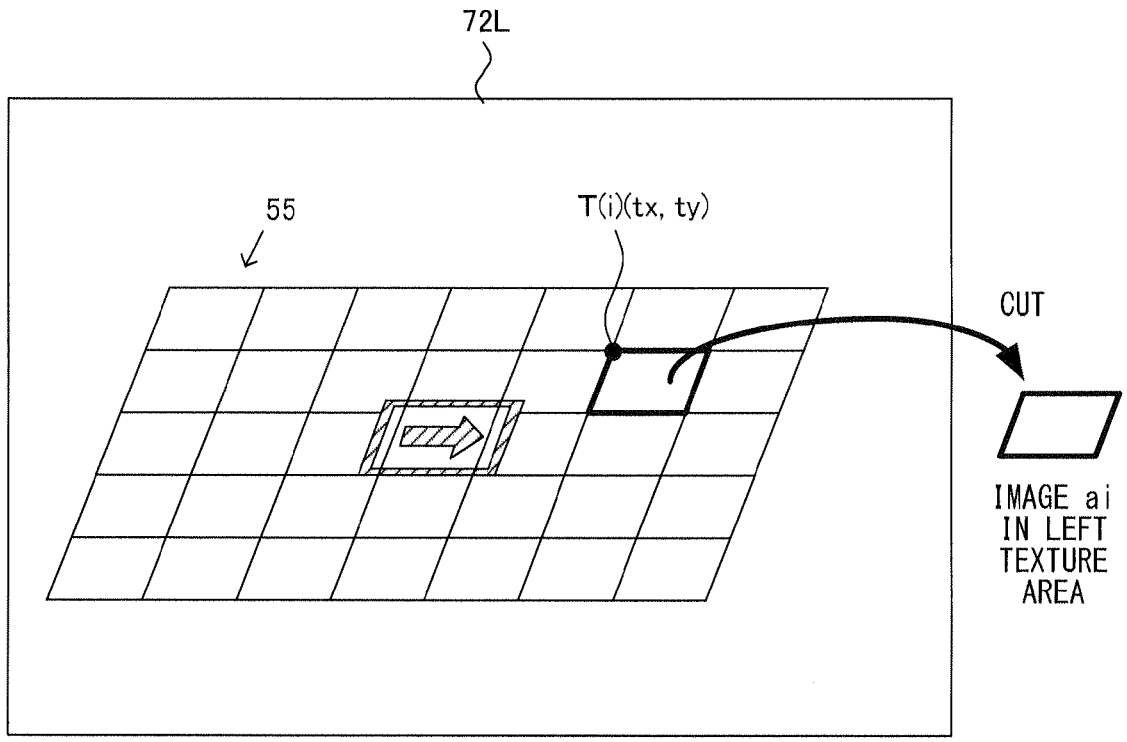
FIG. 16 is a non-limiting exemplary diagram conceptually illustrating processing of step S35, and shows cutting of an image in a left texture area from a real image for a left eye 72L.

FIG. 16 is a diagram conceptually illustrating the processing of step S35, and shows cutting of an image in a left texture area from the real image for a left eye 72L. As shown in FIG. 16, an image ai (parallelogram image including the texture coordinates T(i)) in a left texture area corresponding to the texture coordinates T(i) is cut (copied) from the real image for a left eye 72L. Next, the cut image is applied to the deformation object 56.

Figure 17:
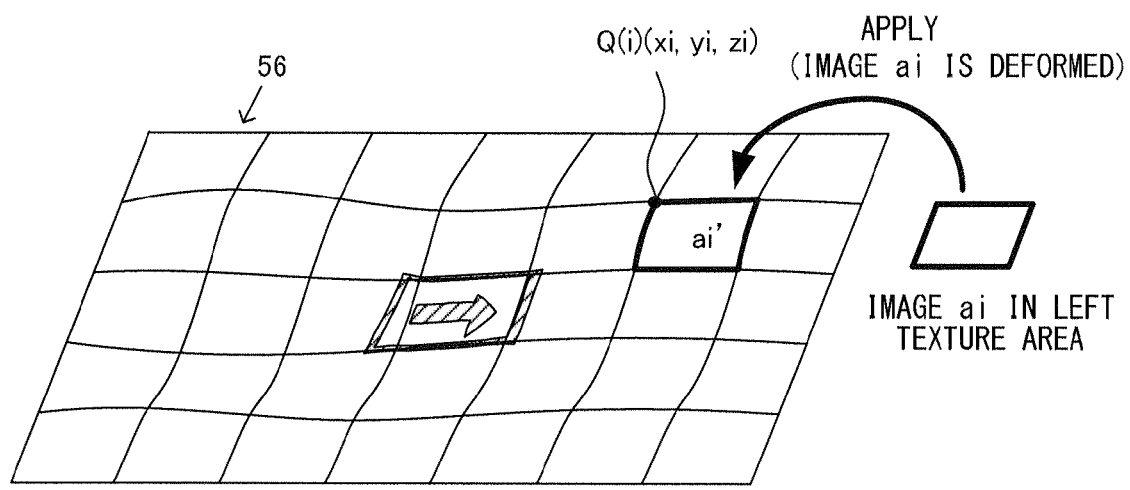
FIG. 17 is a non-limiting exemplary diagram conceptually illustrating the processing of step S35, and shows a non-limiting example of application of a cut image ai in the left texture area shown in FIG. 94 to the deformation object 56.

FIG. 17 is a diagram conceptually illustrating the processing of step S35, and shows application of the cut image ai in the left texture area shown in FIG. 16 to the deformation object 56. As shown in FIG. 17, when the cut image ai in the left texture area has been applied as a texture to the deformation object 56, and then the resultant has been shot by the left virtual camera 53a, the image ai is deformed (image ai'). In this manner, cut images in the respective left texture areas are applied to the deformation object 56.

The left virtual camera image 76L generated in step S35 is an image obtained by deforming a part of the real image for a left eye 72L in an area corresponding to the virtual model 55 (a part, in an area corresponding to the position and the contour of the virtual model 55, of a rendered image of the virtual model 55 shot by the left virtual camera 53a). As described above, the virtual model 55 is placed on the XZ-plane in the marker coordinate system (on the plane (table) in the real space on which the marker 61 is placed). Therefore, the left virtual camera image 76L includes the XZ-plane (plane in the real space) that has been deformed.

It is noted that in step S35, a shadow is applied in accordance with the shape of the deformation object 56. As described above, in step S6, the normal vectors of the vertices Q of the deformation object 56 have been calculated. Therefore, a shadow to be generated when the deformation object 56 is illuminated by a virtual light source can be calculated. In addition, in step S35, the fish object 52 is also shot by the left virtual camera 53a. Therefore, the left virtual camera image 76L also includes an image of the fish object 52.

After generating the left virtual camera image 76L as described above, the information processing section 31 ends the left virtual camera image generation processing.

With reference to FIG. 9, next, the information processing section 31 executes processing of step S8. In step S8, the information processing section 31 executes right virtual camera image generation processing. In the right virtual camera image generation processing in step S8, similarly to the processing of step S7, an image in a texture area that is cut from the real image for a right eye 72R is applied as a texture to the deformation object 56, and the resultant is shot by the right virtual camera 53b.

In step S8, first, the information processing section 31 calculates the texture coordinates T in the real image for a right eye 72R. More specifically, the information processing section 31 multiplies each of the vertices P of the virtual model 55 represented in the marker coordinate system, by the right view matrix for the right virtual camera 53b (a matrix calculated in step S3, the right virtual camera information 75R), and by a projection matrix, thereby obtaining coordinates on the display of the upper LCD 22, and obtaining the texture coordinates in the real image for a right eye 72R. Then, the information processing section 31 sets the respective sets of texture coordinates for the vertices of the deformation object 56, maps textures thereto, and shoots the resultant by the right virtual camera 53b (an image in each of right texture areas is cut from the real image for a right eye 72R, and the image is applied to the deformation object 56). The information processing section 31 generates the right virtual camera image 76R in this manner, and stores the right virtual camera image 76R in the RAM. It is noted that as in step S35, the fish object 52 is also shot by the right virtual camera 53b. Therefore, the right virtual camera image 76R also includes an image of the fish object 52.

Figure 18:
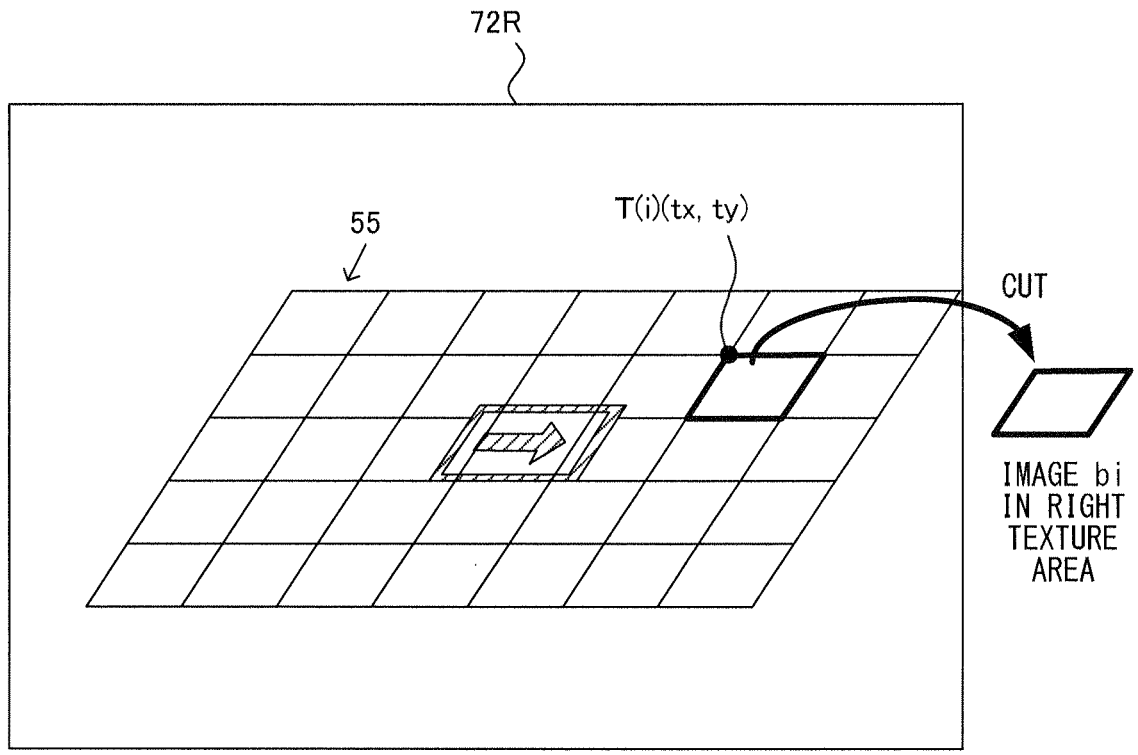
FIG. 18 shows a non-limiting example of cutting of an image in a right texture area from a real image for a right eye 72R.
Figure 19:
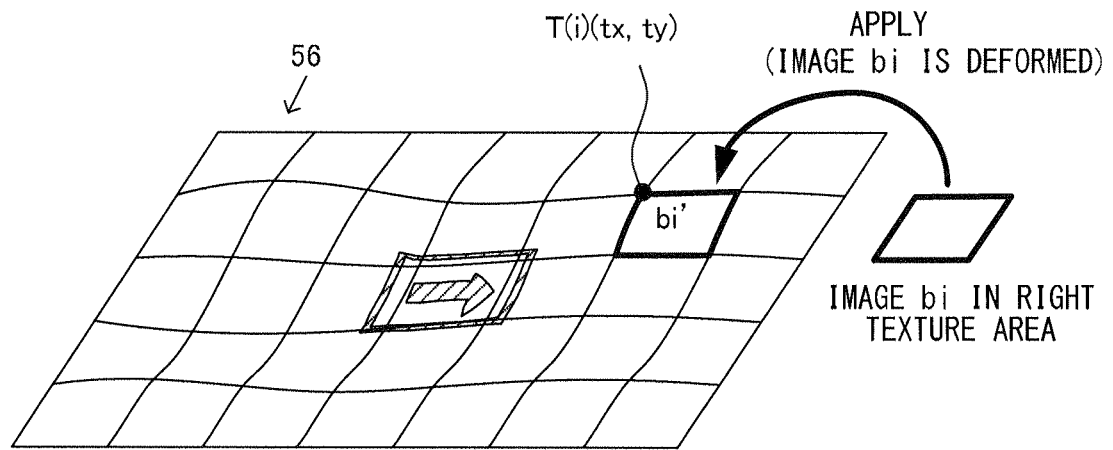
FIG. 19 shows a non-limiting example of application of a cut image bi in the right texture area shown in FIG. 96 to the deformation object 56.

FIG. 18 shows cutting of an image in a right texture area from the real image for a right eye 72R. Since there is a parallax between the real image for a right eye 72R and the real image for a left eye 72L, the real image for a right eye 72R and the real image for a left eye 72L are different from each other. As shown in FIG. 16 and FIG. 18, the position T(i) of each of the vertices P(i) of the virtual model in the real image for a right eye 72R is different from the position T(i) of the corresponding vertex P(i) in the real image for a left eye 72L. Therefore, an image bi in a right texture area cut from the real image for a right eye 72R has a shape different from the shape of an image ai in a left texture area cut from the real image for a left eye 72L. For example, the shape of the image bi in a right texture area is distorted more greatly than the shape of the image ai in a left texture area (in comparison of the image ai shown in FIG. 16 and the image bi shown in FIG. 18, the shape of the image ai is closer to a square than the shape of the image bi). Images in the respective right texture areas cut from the real image for a right eye 72R are applied as textures to the deformation object 56, and the resultant is shot by the right virtual camera 53b. Thus, the images in the respective right texture areas are deformed as in the images in the respective left texture areas. FIG. 19 shows application of the cut image bi in the right texture area shown in FIG. 18 to the deformation object 56. As shown in FIG. 19, when the cut image bi in the right texture area has been applied as a texture to the deformation object 56, and then the resultant has been shot by the right virtual camera 53b, the image bi is deformed (image bi'). In this manner, cut images in the respective right texture areas cut from the real image for a right eye 72R are applied to the deformation object 56.

The right virtual camera image 76R generated in step S8 includes the XZ-plane (plane in the real space) that has been deformed, as in the left virtual camera image 76L generated in step S7. The right virtual camera image 76R and the left virtual camera image 76L are different from each other, and there is a parallax therebetween.

After step S8, the information processing section 31 executes processing of step S9.

In step S9, the information processing section 31 superimposes a virtual camera image onto a real image to generate a superimposed image. Specifically, the information processing section 31 superimposes the left virtual camera image 76L generated in step S7 onto the real image for a left eye 72L obtained in step S2 to generate a left superimposed image. In addition, the information processing section 31 superimposes the right virtual camera image 76R generated in step S8 onto the real image for a right eye 72R obtained in step S2 to generate a right superimposed image. Next, the information processing section 31 executes processing of step S10.

In step S10, the information processing section 31 executes output processing. By executing the output processing, images providing a stereoscopic view is displayed. Specifically, the information processing section 31 outputs two superimposed images generated in step S9 to the upper LCD 22. The left superimposed image displayed on the upper LCD 22 is viewed by the left eye of the user via the parallax barrier, and the right superimposed image is viewed by the right eye of the user via the parallax barrier. As a result, the user can view a stereoscopic image. After step S10, the information processing section 31 executes processing of step S2 again.

Figure 20:
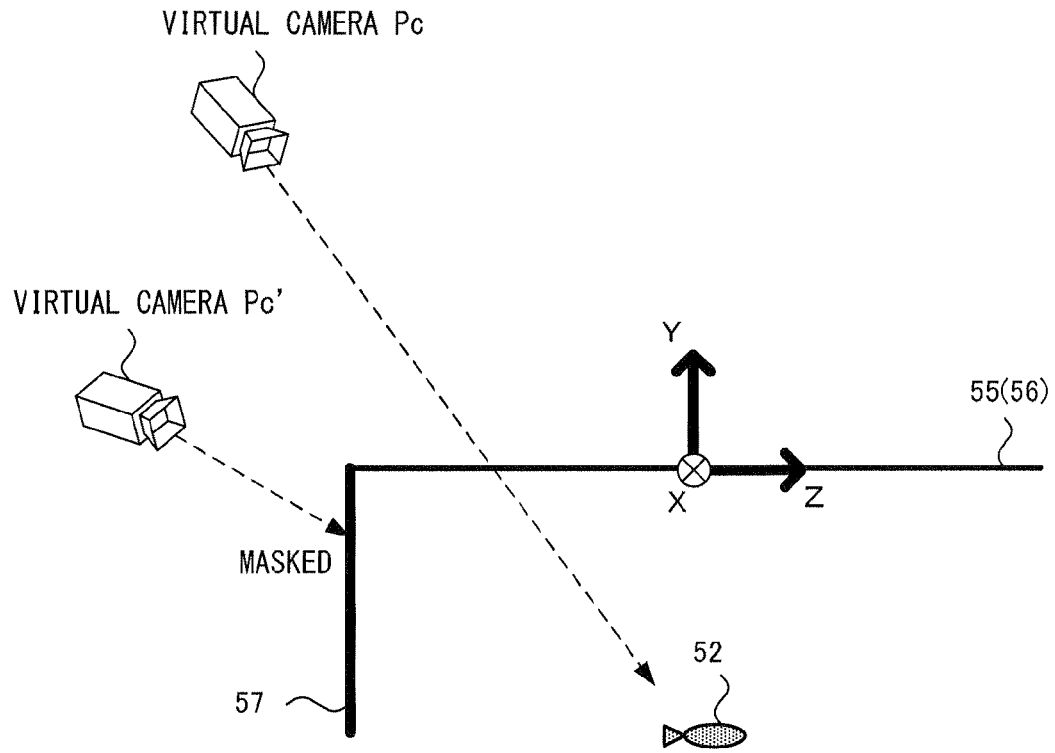
FIG. 20 shows a non-limiting exemplary case where a fish object 52 is masked by a mask object 57.

It is noted that in steps S7 and S8, the fish object 52 might not be shot because the fish object 52 might be masked by the mask object 57 depending on the position or the orientation of a virtual camera. FIG. 20 shows the case where the fish object 52 is masked by the mask object 57, and shows the position relationship between the fish object 52 and a virtual camera when the virtual space is looked at from a direction parallel to the X-axis of the marker coordinate system. The mask object 57 is a virtual object, having a planar shape, that is set at an end portion of the virtual model 55 (deformation object 56). The mask object 57 hides the fish object 52, and is not displayed on the upper LCD 22. As shown in FIG. 20, when the fish object 52 is looked at from the position of a virtual camera Pc (left virtual camera or right virtual camera), the fish object 52 is not masked and is displayed on the upper LCD 22. However, when the fish object 52 is looked at from the position of a virtual camera Pc', the fish object 52 is masked by the mask object 57 and is not displayed on the upper LCD 22. If the mask object 57 is not provided at the end portion of the deformation object 56, when the fish object 52 is looked at from the position of the virtual camera Pc', the fish object 52 might be visible in the backward direction in an area where the plane in the real space is not deformed as the deformation object 56 (that is, an area where a wave does not occur), and as a result, a displayed image might provide a feeling of strangeness. In addition, in the real world, fish in water is not visible owing to reflection of light when the surface of water is looked at from a direction with a low angle (when the surface of water is looked at not from the vertical direction but from a direction almost horizontal). Therefore, the mask object 57 is provided at the end portion of the virtual model 55 (deformation object 56), thereby causing the fish object 52 to be invisible from the virtual camera Pc'. That is, if the deformation object 56 is not present between a virtual camera and the fish object 52 (the deformation object 56 is not present on a line connecting a virtual camera and the fish object 52), the fish object 52 is hidden.

As described above, in the present embodiment, the marker coordinate system is set on the marker 61. The virtual model 55, which has a planar shape, is placed on the XZ-plane (plane on which the marker 61 is placed) in the marker coordinate system, and an area, in the real image for a left eye 72L, that corresponds to the virtual model 55 is set as a left texture area (is cut as an image in a left texture area). Then, the image in the left texture area is applied as a texture to the deformation object 56 into which the virtual model 55 is deformed, and the resultant is shot by the left virtual camera, whereby the left virtual camera image is generated. In addition, an area, in the real image for a right eye 72R, that corresponds to the virtual model 55 is set as a right texture area (is cut as an image in a right texture area). Then, the image in the right texture area is applied as a texture to the deformation object 56 into which the virtual model 55 is deformed, and the resultant is shot by the right virtual camera, whereby the right virtual camera image is generated. As a result, an image including a plane in the real space that has been deformed can be generated, and a scene in which the plane in the real space on which the marker 61 is placed heaves can be displayed as described above.

In addition, in the present embodiment, the marker coordinate system is set on the marker 61 placed in the real space, and a virtual camera is set in accordance with the position and the orientation of a real camera. As a result, it is possible to provide a feeling (augmented reality) that an object present in a virtual space were present in the real space.

In addition, in the present embodiment, texture areas are respectively set for the real image for a left eye 72L and the real image for a right eye 72R (texture images are cut therefrom), to generate the left virtual camera image and the right virtual camera image. Therefore, an image having a high resolution is obtained in comparison with the case where the left virtual camera image and the right virtual camera image are generated from one of the real images. That is, for example, if an image in a left texture area is cut from the real image for a left eye 72L and the right virtual camera image is generated by using the cut image in the left texture area, the image in the left texture area needs to be greatly deformed because there is a parallax between the real image for a left eye 72L and the real image for a right eye 72R. As a result, a large amount of pixel information is lost.

Figure 21:
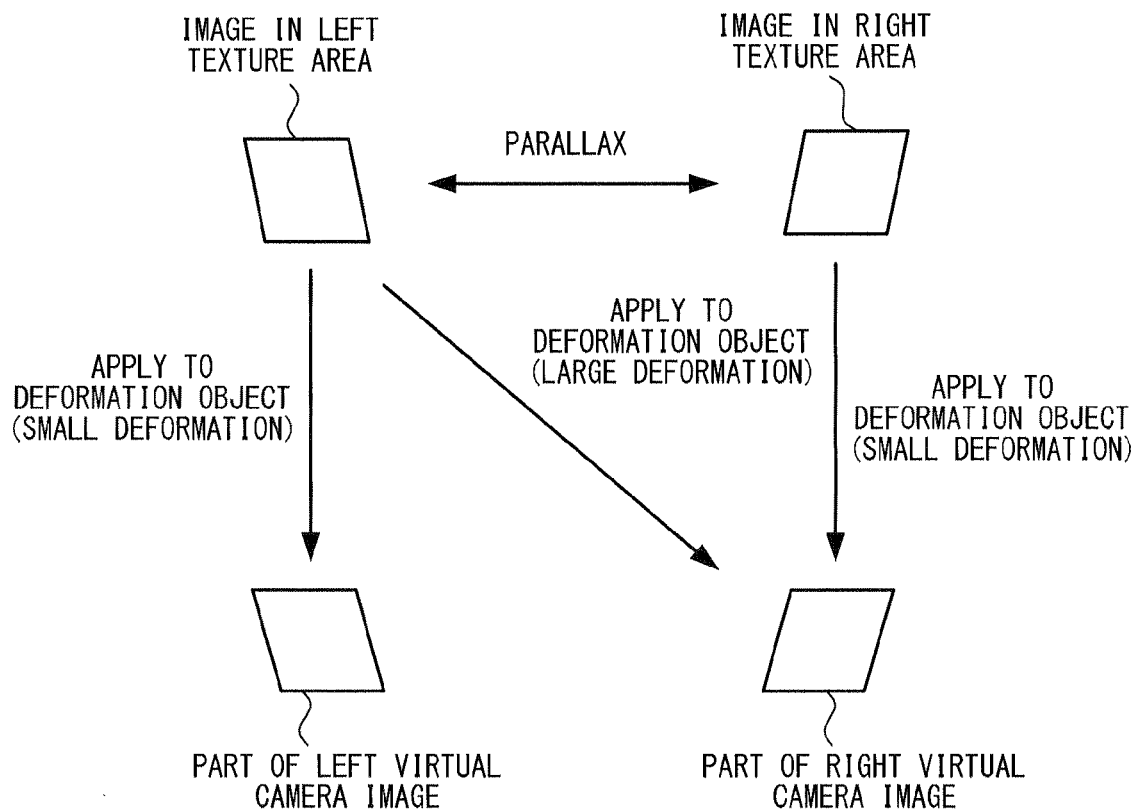
FIG. 21 is a non-limiting exemplary diagram illustrating pixel information being lost when a right virtual camera image is generated by using the image in the left texture area.

FIG. 21 is a diagram illustrating pixel information being lost when the right virtual camera image is generated by using the image in the left texture area. As shown in FIG. 21, when the image in the left texture area is deformed to generate the left virtual camera image, the degree of the deformation of the image in the left texture area is relatively small. In addition, similarly, when the image in the right texture area is deformed to generate the right virtual camera image, the degree of the deformation of the image in the left texture area is relatively small. However, when the image in the left texture area is deformed to generate the right virtual camera image, the image in the left texture area needs to be greatly deformed. If an image is expanded or contracted to be deformed, the resolution of the image is reduced. However, in the present embodiment, texture images are respectively cut from the real image for a left eye 72L and the real image for a right eye 72R. Therefore, it is possible to prevent the resolution from being lowered.

In addition, in the present embodiment, an end portion (boundary) of the deformation object 56 is not deformed. Therefore, when a virtual camera image is superimposed onto a real image, an image whose boundary does not provide a feeling of strangeness is obtained. That is, if the boundary of the deformation object 56 is deformed, when an image shot by a virtual camera is superimposed onto a real image, the resultant image might be discontinuous at the boundary, whereby the image provides a feeling of strangeness. In addition, for example, if a virtual model image obtained by applying textures of the real image to the virtual model 55 which is not deformed is superimposed onto a real image, the overlapped areas coincide with each other. Therefore, a certain area (area corresponding to the virtual model) of the real image is completely hidden by the virtual model image, and the resultant image does not provide a feeling of strangeness. However, if, in deformation of the virtual model 55 into the deformation object 56, the boundary of the deformation object 56 is also deformed, when a deformation object image obtained by shooting the deformation object 56 is superimposed onto a real image, an area that is not hidden by the deformation object image occurs in the real image. Therefore, in some cases (for example, the case where the deformed object becomes smaller than the virtual model as a result of the deformation), the same two areas might be present in an image obtained by superimposing the deformation object image onto the real image and, whereby the image becomes unnatural. However, in the present embodiment, since the boundary of the deformation object 56 is not deformed, such an area that is not hidden by a deformation object does not occur. Therefore, it does not happen that the same two areas are doubly displayed, and a natural image is obtained.

In addition, when a deformed object is shot by the left virtual camera, a real image for a left eye is applied as textures, and when a deformed object is shot by the right virtual camera, a real image for a right eye is applied as textures, whereby continuity at the boundary can be better maintained. That is, for example, if textures cut from a real image for a left eye are applied to a deformed object, and a right virtual camera image obtained by shooting the resultant deformed object by a right virtual camera is superimposed onto the real image for a right eye, mismatch can occur between the background part in the real image for a right eye and a portion corresponding to the deformed object, in some cases (for example, in the case where an area visible only from one of real cameras is present). Thus, if respective textures are generated by using one of real images, continuity at the boundary cannot be maintained. However, in the present embodiment, since textures are generated by using the respective real images, continuity at the boundary can be maintained.

(Variations)

It is noted that in the present embodiment, a virtual model having a planar shape is placed on a plane on which the marker 61 is placed, and an image showing the plane heaving is displayed. In other embodiments, instead of a virtual model having a planar shape, a virtual model having a curved surface may be used (a 3-dimensional object may be used). For example, a virtual model may be placed so as to follow the shape of a 3-dimensional object (which may be a cup, the face of a person, or the like) present in the real space, and the virtual model may be deformed, to display a scene in which the 3-dimensional object in the real space is deformed. For example, the shape of a 3-dimensional object present in the real space may be recognized by using a camera capable of measuring a depth (distance in the forward direction of the camera) by infrared light or the like, a virtual model having the recognized shape may be set in a virtual space, and the 3-dimensional object may be deformed. Alternatively, based on a parallax between two images shot by the outer imaging section 23, a distance in the forward direction of a camera may be calculated. In addition, by using the above-described method, a scene in which a wall in the real space is deformed, or a scene in which a curtain swings may be displayed.

In addition, in other embodiments, by using the above-described method, a scene in which a part of the real space is deformed may be displayed, instead of a plane, a curved surface, or the like (for example, a table or the face of a person) in the real space.

In addition, in the present embodiment, a plane in the real space is deformed like the surface of water, using a fishing game as an example. However, the above-described processing can be applied to any types of games.

In addition, in the present embodiment, images (texture images) in texture areas cut respectively from left and right real images are applied to a deformed object into which a virtual model is deformed. In other embodiments, a virtual object may not be deformed. That is, in other embodiments, a left texture image obtained from a real image for a left eye may be applied as a texture to a virtual model and the resultant may be shot by a left virtual camera, and a right texture image obtained from a real image for a right eye may be applied as a texture to the virtual model and the resultant may be shot by a right virtual camera. In this way, by cutting texture images respectively from left and right real images, images shot by real cameras can be used as textures for a virtual model, and a stereoscopic image of the virtual model can be generated. By using a virtual model for display, it becomes possible to perform processing of changing the shooting direction of a virtual camera, or changing the color or the direction in writing. In this case, in the present embodiment, texture images are cut respectively from left and right images, and are applied as textures. Therefore, it is possible to prevent the resolution from being lowered. It is noted that the resolution is lowered if texture images are cut from one of the real images, the texture images are applied as textures, and the resultant is shot by both a left virtual camera and a right virtual camera.

In addition, in the present embodiment, the marker 61 is shot by the outer imaging section 23, and the position relationship (relative position and relative orientation) between the outer imaging section 23 and the marker 61 is calculated. Then, based on the calculated position relationship, a virtual space (marker coordinate system) is set. In other embodiments, an object other than the marker 61 may be recognized in a shot image, to calculate the position relationship. For example, a predetermined object present in the real space (for example, a chair or a table present in the real space) may be detected by image recognition such as pattern matching, to calculate the position relationship and define a virtual space. That is, in other embodiments, a particular object (the marker or the predetermined object mentioned above) present in the real space may be recognized in a shot image, and the position relationship between the particular object and the outer imaging section 23 may be calculated. In addition, instead of recognition based on an image shot by a real camera, the particular object may be recognized by another recognition means (for example, an ultrasonic sensor), to calculate the position relationship between the particular object and the outer imaging section 23.

In addition, in other embodiments, the position and the orientation of a real camera may be detected by a GPS, an acceleration sensor, an angular velocity sensor, a geomagnetic sensor, or the like. Then, the position and the orientation of a virtual camera in a virtual space may be set based on the detected position and orientation, and an image obtained by shooting the virtual space by a virtual camera may be superimposed onto an image shot by the real camera. For example, a virtual object may be placed at a predetermined position, in a virtual space corresponding to the real space, and a position, in the real space, that corresponds to the predetermined position in the virtual space may be shot by a real camera from a predetermined direction. In this case, the position and the orientation of the real camera can be detected by a GPS or orientation detection means (an acceleration sensor, an angular velocity sensor, a geomagnetic sensor, or the like), and a virtual camera can be set in the virtual space such that the position and the orientation of the virtual camera coincide with the position and the orientation of the real camera.

In addition, in the present embodiment, augmented reality is realized by using a video see-through method. That is, in the present embodiment, an image shot by a virtual camera (left or right virtual camera) is superimposed onto an image shot by the outer imaging section 23, to generate a superimposed image, and the superimposed image is displayed on the upper LCD 22. In other embodiments, augmented reality may be realized by using a optical see-through method. For example, the user may wear a head-mounted display having a camera for detecting a marker placed in the real space, and the user may view the real space via a display section which corresponds to lenses of glasses. The display section is formed of a material allowing the real world to be directly guided into the eyes of the user. Moreover, an image of a virtual object generated by a computer can be displayed in the display section.

In addition, in other embodiments, the method of shooting processing described above may be applied to any electronic device such as a PDA (Personal Digital Assistant), a high-tech mobile telephone, or a camera (camera apparatus), instead of a game apparatus.

In the present embodiment, an LCD capable of displaying an image that is stereoscopically visible by naked eyes is used as a display apparatus. In other illustrative embodiments, a stereoscopic display using glasses based on a time sharing system, a polarizing filter method, an anaglyph method (red and blue glasses method), or the like may be used.

In addition, in other embodiments, the display processing method described above may be realized by a display processing system in which processing is shared by a plurality of information processing apparatuses which are connected, for example, by wire or wirelessly, in a communicable manner. For example, the outer imaging section 23 and the information processing apparatus may be separately provided, and the outer imaging section 23 may be connected to the information processing apparatus, wirelessly or by another means. The information processing apparatus and the display apparatus may be separately provided, and may be connected to each other. The position and the orientation of the outer imaging section 23 may be detected by detection means provided separately from the information processing apparatus, and a result of the detection may be transmitted to the information processing apparatus.

In addition, in the present embodiment, the information processing section 31 of the game apparatus 10 executes a predetermined program, to execute processing of the flowchart. In other embodiments, a part or all of the above steps of processing may be executed by a dedicated circuit included in the game apparatus 10.

In addition, the above game program (information processing program) may be stored in a computer-readable storage medium such as an optical disc or a magnetic disc, instead of the memory mentioned above, and then may be supplied to the game apparatus 10. In addition, for example, the program may be stored in a RAM in a server in a network, and the program may be supplied to the game apparatus 10 by the game apparatus 10 being connected to the network.

While the illustrative embodiments have been described in detail, the foregoing description is in all aspects illustrative and not restrictive. It will be understood that numerous other modifications and variations can be devised.

What is claimed is:

1. A non-transitory computer-readable storage medium having stored therein instructions executed by a computer of an information processing apparatus connected to a left real camera and a right real camera for shooting a real space, and a display device capable of displaying a stereoscopic visible image, the stored instructions comprising instructions that are configured to cause the computer to:
 obtain a real image for a left eye shot by the left real camera;
 obtain a real image for a right eye shot by the right real camera;
 set a left virtual camera in a virtual space that is three-dimensional, the left virtual camera set at a position and an orientation that corresponds to the left real camera in the real space;
 set a right virtual camera in the virtual space in accordance with a position and an orientation of the right real camera in the real space;
 locate a virtual model in the virtual space;
 set, as a left texture area, an area in the real image for a left eye that is to be applied to the virtual model that is located in the virtual space;
 set, as a right texture area, an area in the real image for a right eye that is to be applied to the virtual model that is located in the virtual space;
 apply at least some portion of the set left texture area to the virtual model;
 generate, based on at least the set left virtual camera and the portion of the set left texture area, a left virtual camera image of the virtual space that includes a view of the virtual model located in the virtual space;
 apply at least some portion of the set right texture area to the virtual model;
 generate, based on at least the right virtual camera and the portion of the set right texture area a right virtual camera image of the virtual space that includes a view of the virtual model located in the virtual space; and
 display the generated left virtual camera image and the generated right virtual camera image on the display in a stereoscopic manner.

2. The non-transitory computer-readable storage medium according to claim 1, wherein
 a left texture area is set corresponding to the position and the contour of the virtual model viewed by the left virtual camera, and
 a right texture area is set corresponding to the position and the contour of the virtual model viewed by the right virtual camera.

3. The non-transitory computer-readable storage medium according to claim 1, wherein the stored instructions further comprise instructions that are configured to cause the computer to:
 generate a superimposed image for a left eye by superimposing the left virtual camera image onto the real image for a left eye; and
 generate a superimposed image for a right eye by superimposing the right virtual camera image onto the real image for a right eye,
 wherein the superimposed image for a left eye and the superimposed image for a right eye are displayed to the display device.

4. The non-transitory computer-readable storage medium according to claim 3, wherein the stored instructions further comprise instructions that are configured to cause the computer to:
 load a base virtual model; and
 deform the base virtual model by adjusting geometry thereof to generate the virtual model,
 wherein the virtual model that is located in the virtual space is the generated virtual model.

5. The non-transitory computer-readable storage medium according to claim 4, wherein
 the virtual model has a planar shape or a curved-surface shape, and is set in the virtual space so as to follow the shape of a plane or a curved surface in the real space.

6. The non-transitory computer-readable storage medium according to claim 4, wherein no end portions of the base virtual model are deformed to generate the virtual model.

7. The non-transitory computer-readable storage medium according to claim 4, wherein the stored instructions further comprise instructions that are configured to cause the computer to locate a second object, different from the generated virtual model, in the virtual space such that the second object has a predetermined position relationship with the generated virtual model, wherein
 the left virtual camera image shot by the left virtual camera includes the second object, and
 the right virtual camera image shot by the right virtual camera includes the second object.

8. The non-transitory computer-readable storage medium according to claim 7,
 wherein the second object is placed so as to be away from the generated virtual model in a shooting direction of each of the left virtual camera and the right virtual camera,
 wherein the stored instructions further comprise instructions configured to cause the computer to use a predetermined mask object for masking the second object at an end portion of the generated virtual model.

9. The non-transitory computer-readable storage medium according to claim 3, wherein:
 the obtained real image for the left eye and the obtained real image for the right eye includes an image of a marker, having a predetermined planar shape, that is located the real space,
 the left virtual camera is set in accordance with the position and the orientation of the left real camera in the real space relative to the position and the orientation of the marker,
 the right virtual camera is set in accordance with the position and the orientation of the right real camera in the real space relative to the position and the orientation of the marker,
 the virtual model has a planar shape and, is placed on a plane in the virtual space that corresponds to a virtual plan upon which the marker is placed in the real space,
 wherein the stored instructions further comprise instructions that are configured to cause the computer to:
 deform a base virtual model by adjusting geometry thereof to generate the virtual model,
 wherein the virtual model that is located in the virtual space is the generated virtual model.

10. The non-transitory computer-readable storage medium according to claim 1, wherein the stored instructions further comprise instructions that are configured to cause the computer to:
- detect a specific subject included in the real image for a left eye and the real image for a right eye
- obtain relative positions and relative orientations of the left real camera and the specific subject present in the real space with respect to each other based on a result of the detection of the specific subject in the real image for the left eye;
- obtain relative positions and relative orientations of the right real camera and the specific subject present in the real space with respect to each other based on a result of the detection of the specific subject in the real image for the right eye;
- set the left and right virtual cameras based on the respectively obtained relative positions and relative orientations of the left and right real cameras.

11. The non-transitory computer-readable storage medium according to claim 10, wherein the virtual model is placed based on a position, in the virtual space, that corresponds to the position of the specific subject in the real space.

12. An information processing apparatus connected to a left real camera and a right real camera for shooting a real space, and to display device capable of displaying a stereoscopic visible image, the information processing apparatus comprising:
- a processing system that includes at least one processor, the processing system configured to:
  - obtain a real image for a left eye shot by the left real camera;
  - obtain a real image for a right eye shot by the right real camera;
  - set a left virtual camera in a virtual space that is three-dimensional, the left virtual camera set at a position and an orientation that corresponds to the left real camera in the real space;
  - set a right virtual camera in the virtual space in accordance with a position and an orientation the right real camera in the real space;
  - locate the virtual model in the virtual space;
  - determine a left texture image from an area of the real image for a left eye that is to be applied to the virtual model that is located in the virtual space;
  - determine a right texture image from the real image for a right eye that is to be applied to the virtual model that is located in the virtual space;
  - texture map at least some portion of the determined left texture image to the virtual model;
  - generate a left virtual camera image of the texture mapped virtual model as viewed in accordance with the set left virtual camera;
  - texture map the determined right texture image to the virtual model;
  - generate a right virtual camera image of the texture mapped virtual model as viewed in accordance with the set right virtual camera; and
  - display, in a stereoscopic manner, the generated left virtual camera image and the generated right virtual camera image on the display device.

13. An information processing system comprising:
- a left real camera and a right real camera for shooting a real space;
- a display device capable of displaying a stereoscopic visible image; and
- a processing system that includes at least one computer processor, the processing system configured to:
  - obtain a real image for a left eye shot by the left real camera;
  - obtain a real image for a right eye shot by the right real camera;
  - set a left virtual camera in a virtual space that is three-dimensional, the left virtual camera set at a position and an orientation that corresponds to the left real camera in the real space;
  - set a right virtual camera in the virtual space in accordance with a position and an orientation the right real camera in the real space;
  - locate a virtual model in the virtual space;
  - set a left texture area in the real image for a left eye that is to be applied to the virtual model that is located in the virtual space;
  - set a right texture area in the real image for a right eye that that is to be applied to the virtual model that is located in the virtual space;
  - apply an image from the left texture area to the virtual model;
  - generate, based on the set left virtual camera, a left virtual camera image of the virtual space that includes a view of the virtual model located in the virtual space;
  - apply an image from the right texture area to the virtual model;
  - generate, based on the set right virtual camera, a right virtual camera image of the virtual space that includes a view of the virtual model located in the virtual space; and
  - output the generated left virtual camera image and the generated right virtual camera image to the display device such that the left virtual camera image is viewed by the left eye of a user and the right virtual camera image is viewed by the right eye of the user.

14. An information processing method comprising:
- obtaining a real image for a left eye shot by a left real camera for shooting a real space;
- obtaining a real image for a right eye shot by a right real camera for shooting the real space;
- setting a left virtual camera in a virtual space that is three-dimensional, the left virtual camera set at a position and an orientation that corresponds to the left real camera in the real space,
- setting a right virtual camera in a virtual space in accordance with a position and an orientation of the right real camera in the real space;
- locating a virtual model in the virtual space;
- setting, as a left texture area, an area in the real image for a left eye that is to be applied to the virtual model located in the virtual space;
- setting, as a right texture area, an area in the real image for a right eye that is to be applied to the virtual model located in the virtual space;
- applying at least a portion of the left texture area to the virtual model;
- generating, based on at least the set left virtual camera and the applied portion of the left texture area, a left virtual camera image of the virtual space that includes a view of the virtual model located in the virtual space;
- applying at least a portion of the right texture area to the virtual model;
- generating, based on at least the set right virtual camera and the applied portion of the right texture area, a right virtual camera image of the virtual space that includes a view of the virtual model located in the virtual space shot; and displaying the left virtual camera image and the right virtual camera image in a stereoscopic manner on a display device capable of displaying a stereoscopic visible image.

* * * * *